Feb. 2, 1965  W. L. PERRY  3,168,257

WINDING MACHINE

Filed Sept. 29, 1961  30 Sheets—Sheet 1

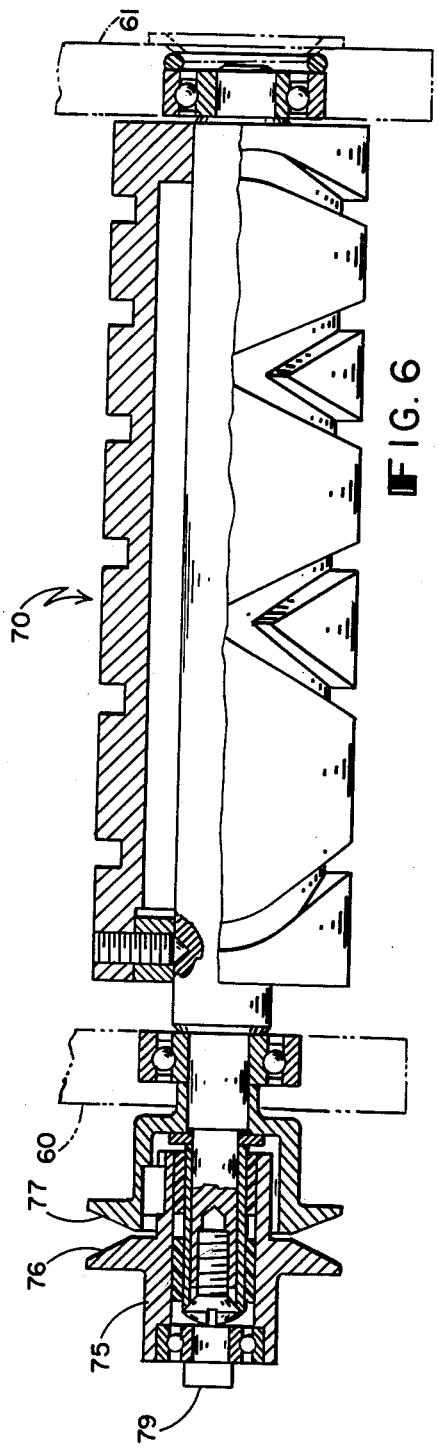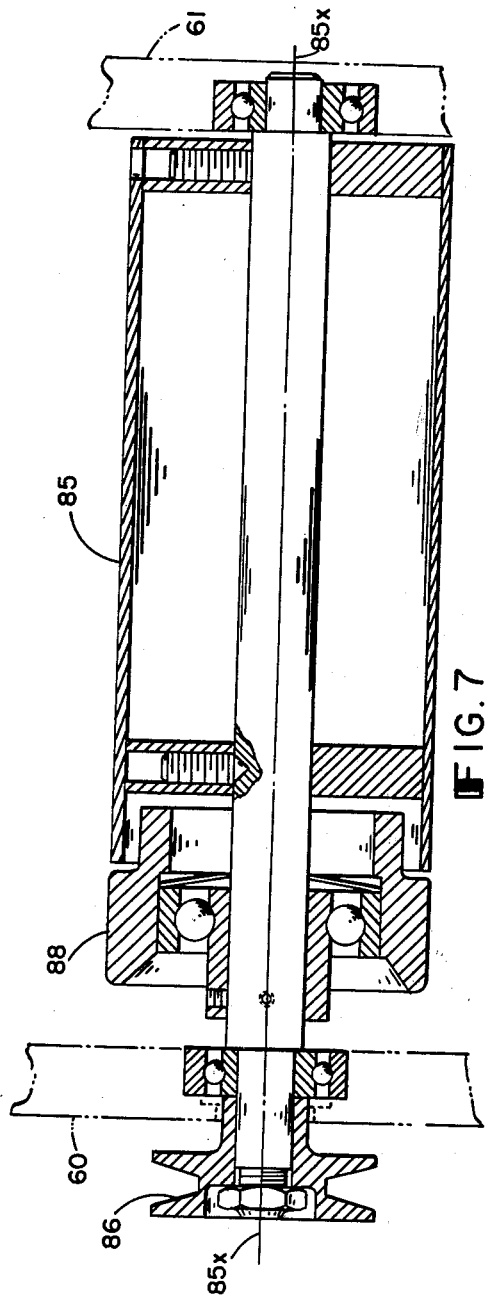

Feb. 2, 1965 W. L. PERRY 3,168,257
WINDING MACHINE
Filed Sept. 29, 1961 30 Sheets-Sheet 7
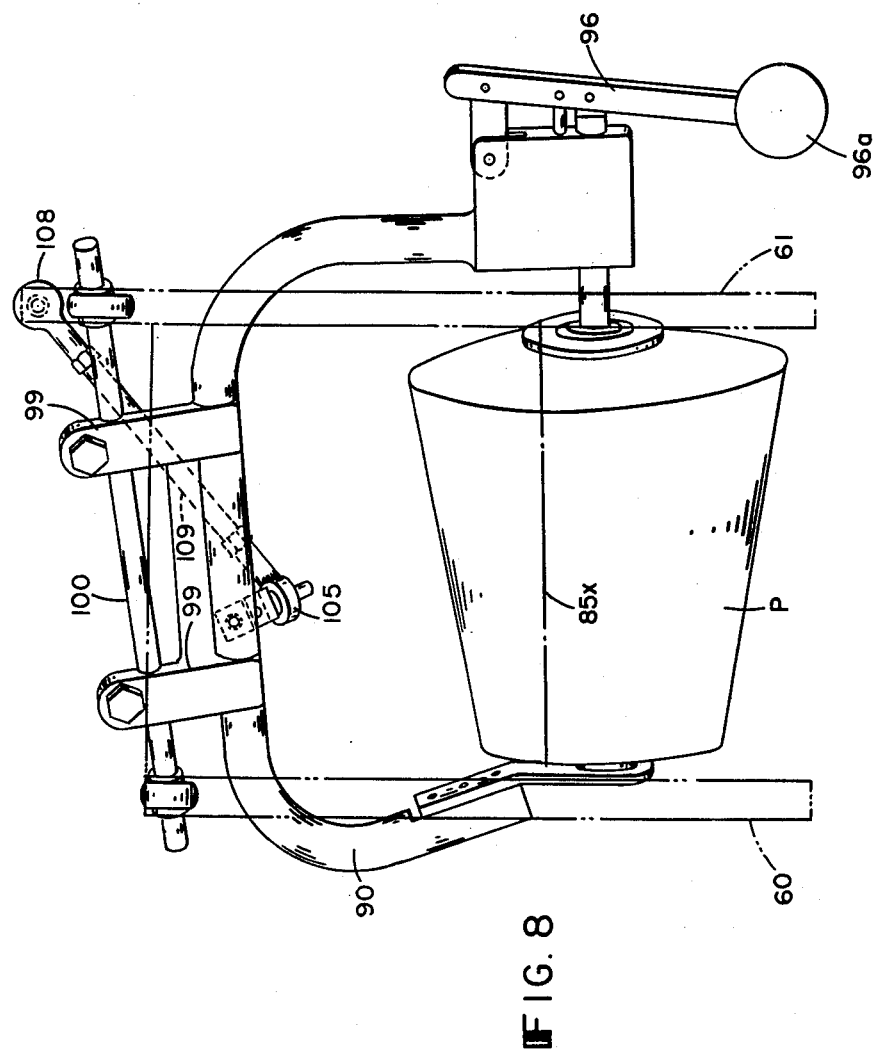

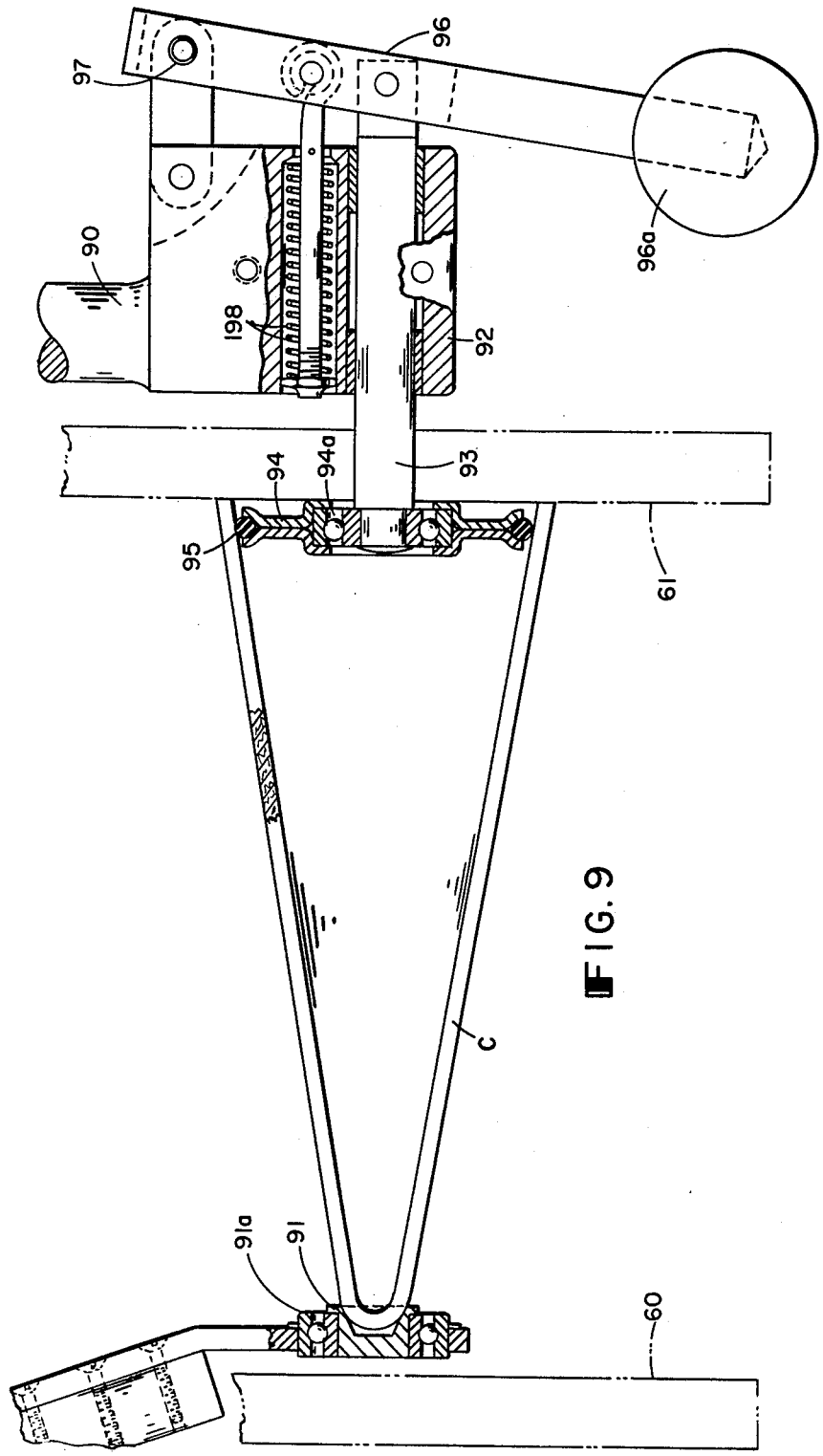

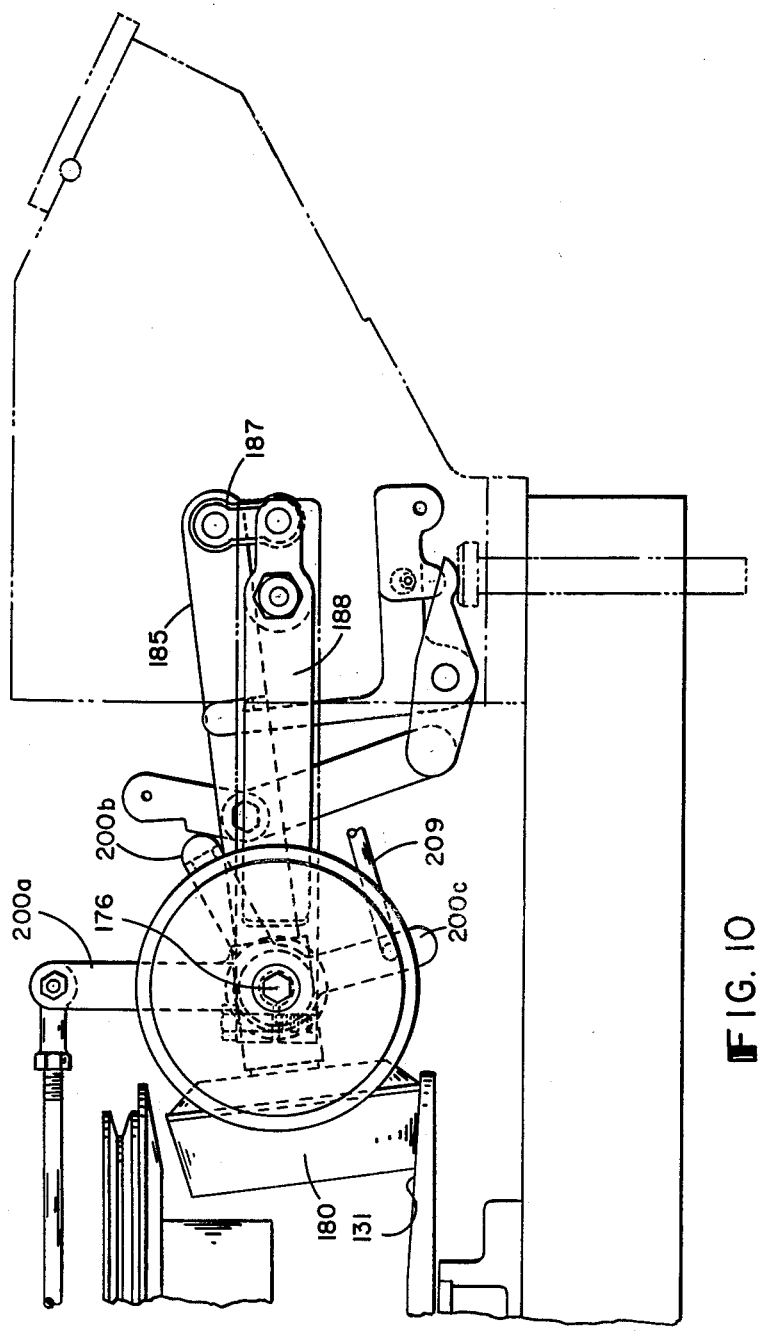

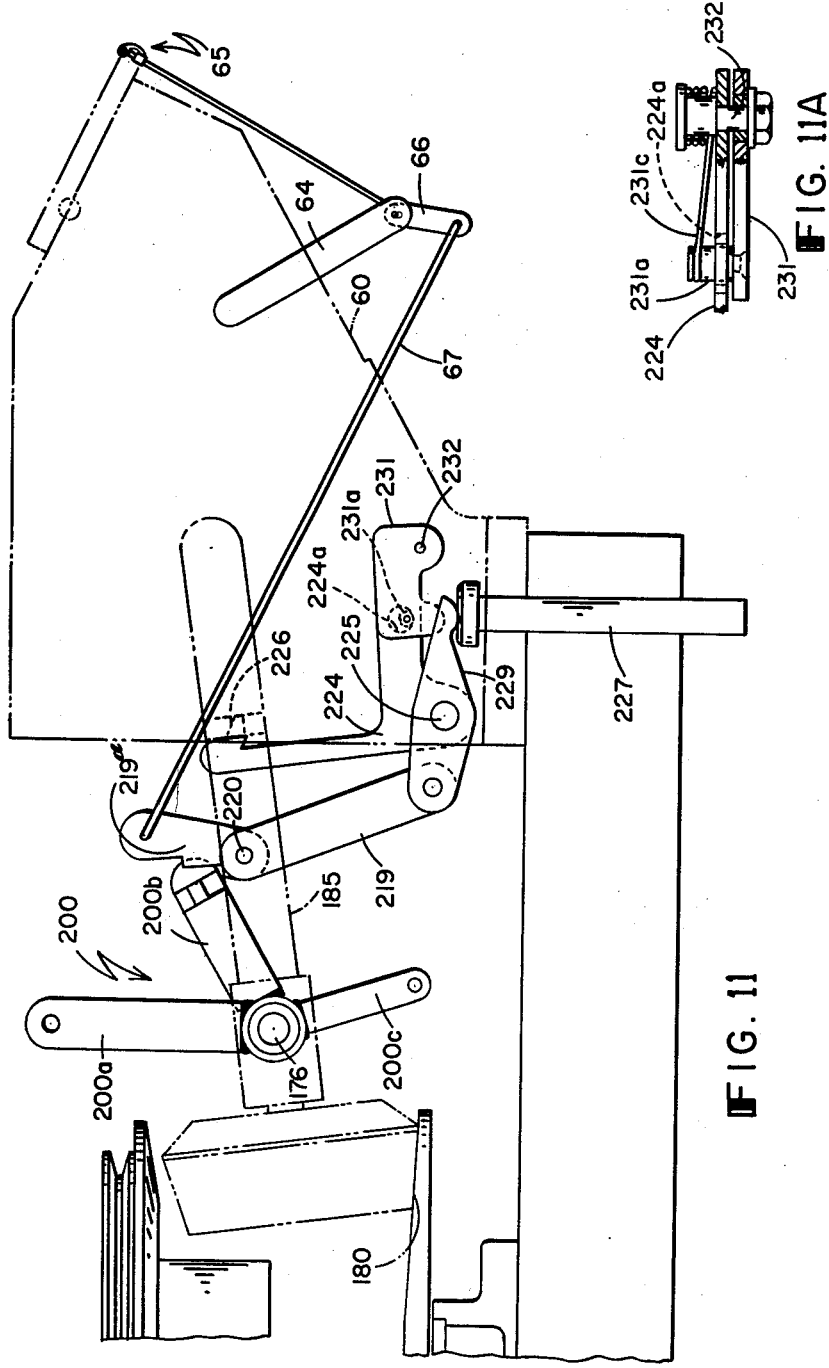

Feb. 2, 1965  W. L. PERRY  3,168,257
WINDING MACHINE

Filed Sept. 29, 1961  30 Sheets-Sheet 11

Feb. 2, 1965 W. L. PERRY 3,168,257
WINDING MACHINE
Filed Sept. 29, 1961 30 Sheets-Sheet 13

Feb. 2, 1965 W. L. PERRY 3,168,257
WINDING MACHINE
Filed Sept. 29, 1961 30 Sheets-Sheet 14

Feb. 2, 1965     W. L. PERRY     3,168,257
WINDING MACHINE
Filed Sept. 29, 1961

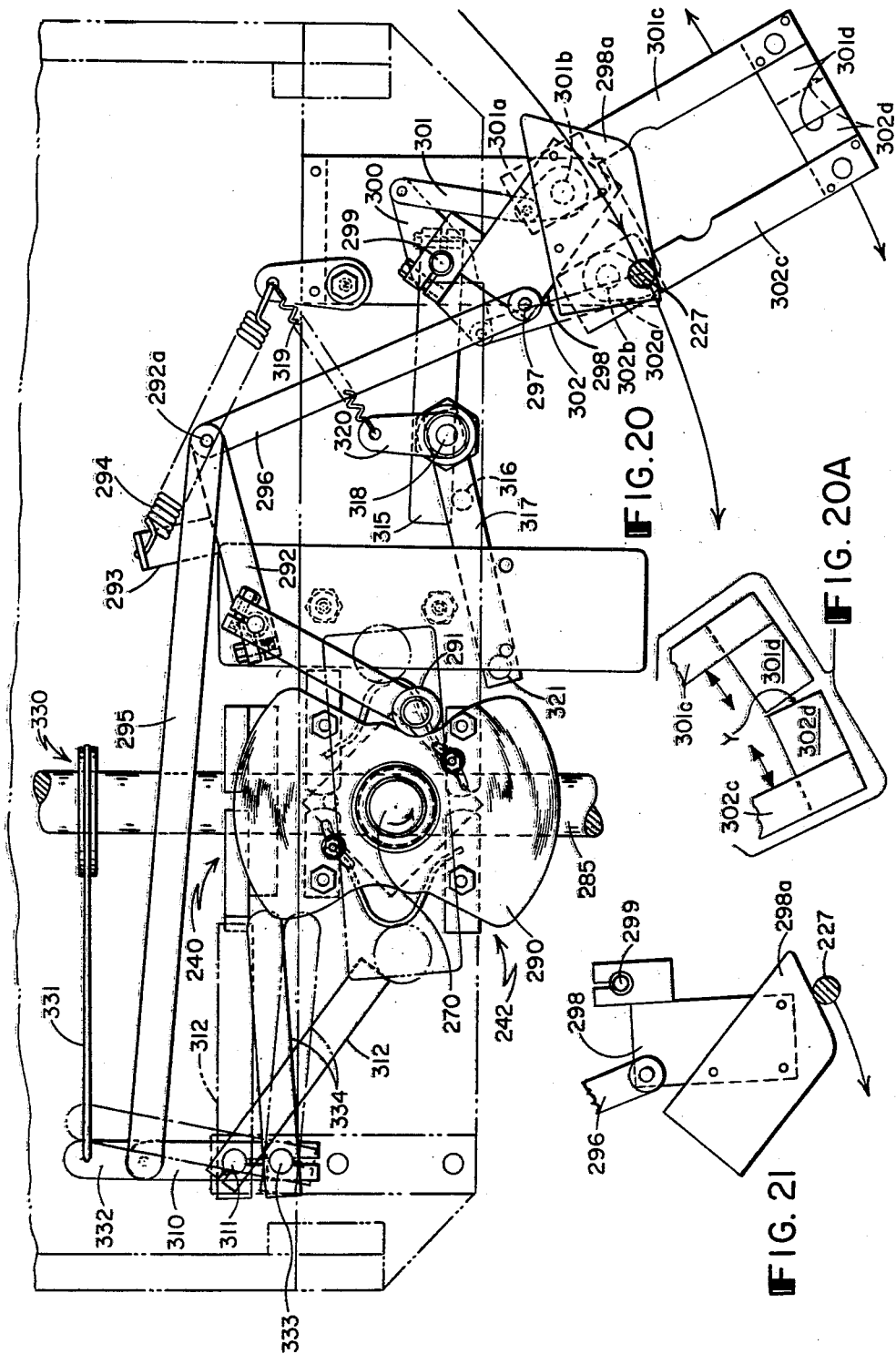

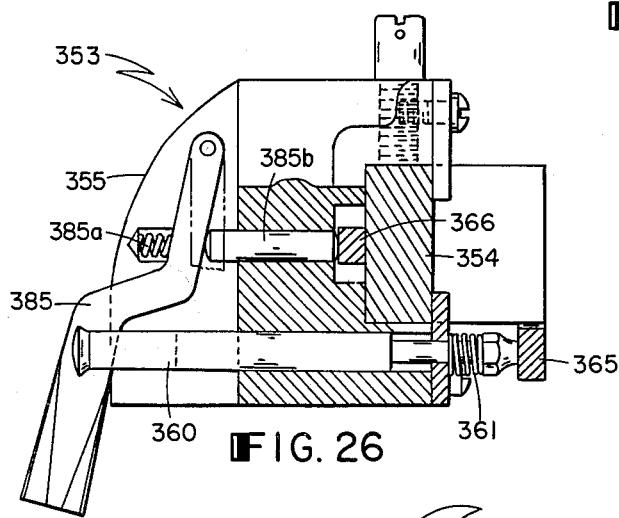
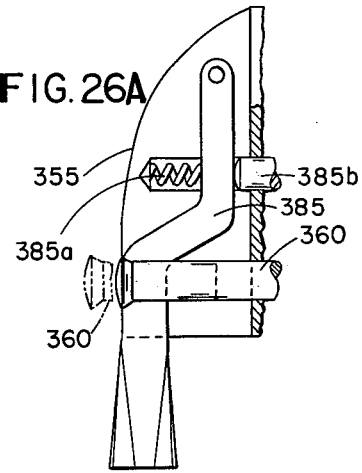
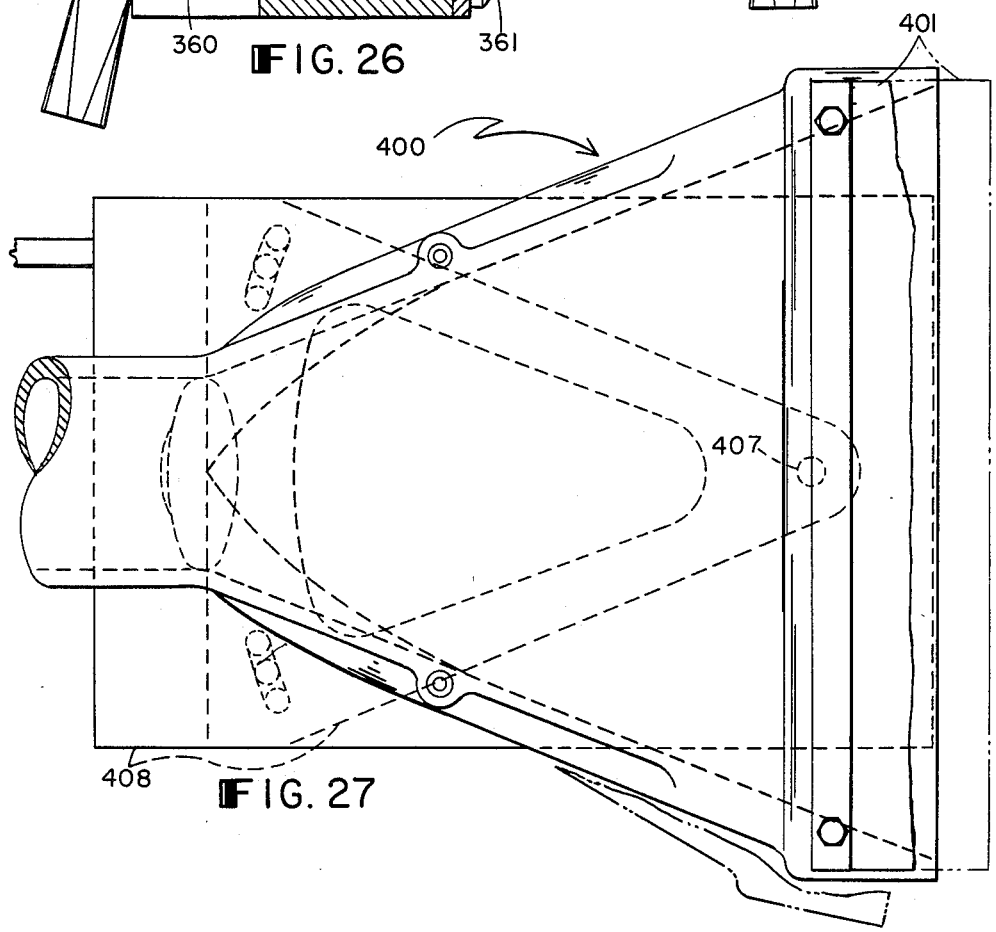

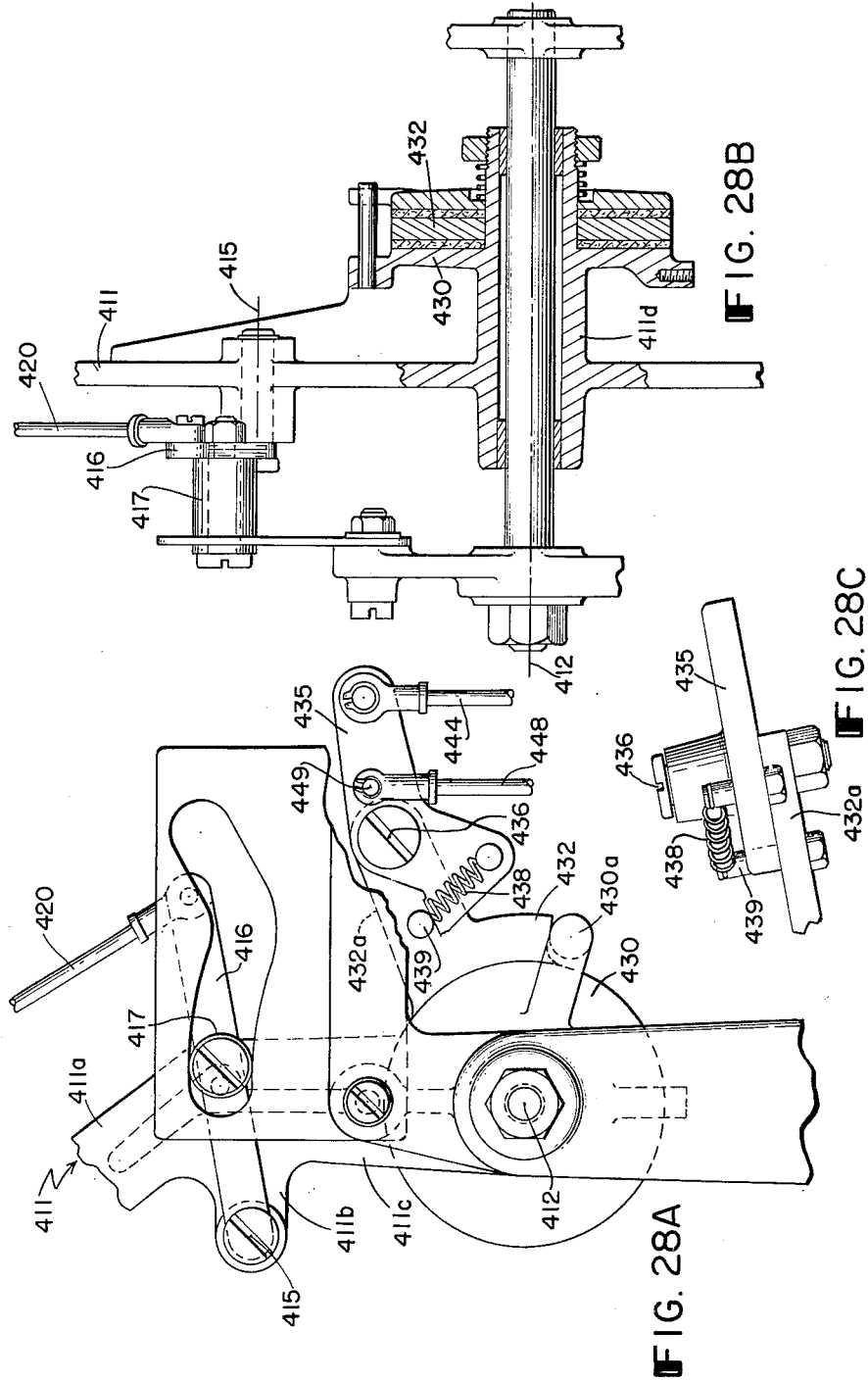

Feb. 2, 1965 W. L. PERRY 3,168,257
WINDING MACHINE
Filed Sept. 29, 1961 30 Sheets-Sheet 30

United States Patent Office 3,168,257
Patented Feb. 2, 1965

3,168,257
WINDING MACHINE
Winthrop L. Perry, Milford, N.H., assignor to Abbott Machine Co., Inc., Wilton, N.H., a corporation of New Hampshire
Filed Sept. 29, 1961, Ser. No. 141,884
6 Claims. (Cl. 242—35.5)

This invention relates to winding machines and has among its general objects to simplify and improve the automatic tending of winding units, to render economical the construction of a machine in which any winding unit that requires tending will have only a minimum of lost time of operation before it is tended, and to coordinate the construction of winding units, their conveying means, detecting means and the tending means, to produce certainty of operation. More particular objects and advantages will appear from the explanation of the invention in this specification and its accompanying drawings.

In the accompanying drawings:

FIG. 6 is a detailed view showing a traverse cam for a winding unit.

FIG. 7 is a detailed view showing a winding package drive roll for a winding unit.

FIG. 8 is a plan view showing a winding package holder.

FIG. 9 shows in more detail certain of the structure of FIG. 8.

FIG. 10 is a diagram in the nature of an elevation with many parts removed, showing certain linkage within a winding unit.

FIG. 11 is a diagram in the nature of an elevation showing certain parts of the winding unit in winding operation.

FIG. 11A is a detailed view showing the interconnection between two of the parts shown in FIG. 11.

FIG. 20 is a diagrammatic view in the nature of a plan, with numerous parts removed, showing feeler and clutch control mechanism.

FIG. 20A is a fragmentary view showing a different position of the feeler mechanism of FIG. 20.

FIG. 21 is a fragmentary view showing a still different position of portions of the feeler mechanism of FIG. 20.

FIG. 24A is a fragmentary view showing a position of the package yarn end finding nozzle different from those of FIG. 24.

FIG. 26 is a detailed view of the body portion of the bobbin yarn end carrier.

FIG. 26A is a fragmentary view showing a portion of the end carrier in different positions.

FIG. 27 is a plan view of the package yarn end finding nozzle.

FIG. 28A is a diagrammatic view in the nature of an elevation with parts broken away showing means for operating the package yarn end-finding nozzle.

FIG. 28B shows portions of the structure of FIG. 28A partly in right side elevation and partly in vertical section as taken through the main axis of rotation of the driving mechanism of FIG. 28A.

FIG. 28C is a fragmentary view in the nature of a projection of certain parts of FIG. 28A.

FIG. 32A is a detail taken on the view line 32A of FIG. 32 showing the lower portion of the bobbin chute.

In its general organization the illustrated machine may be considered to involve two main mechanisms, namely, winding mechanism and automatic tending mechanism, these being interrelated by various driving and controlling means.

Figure 1:
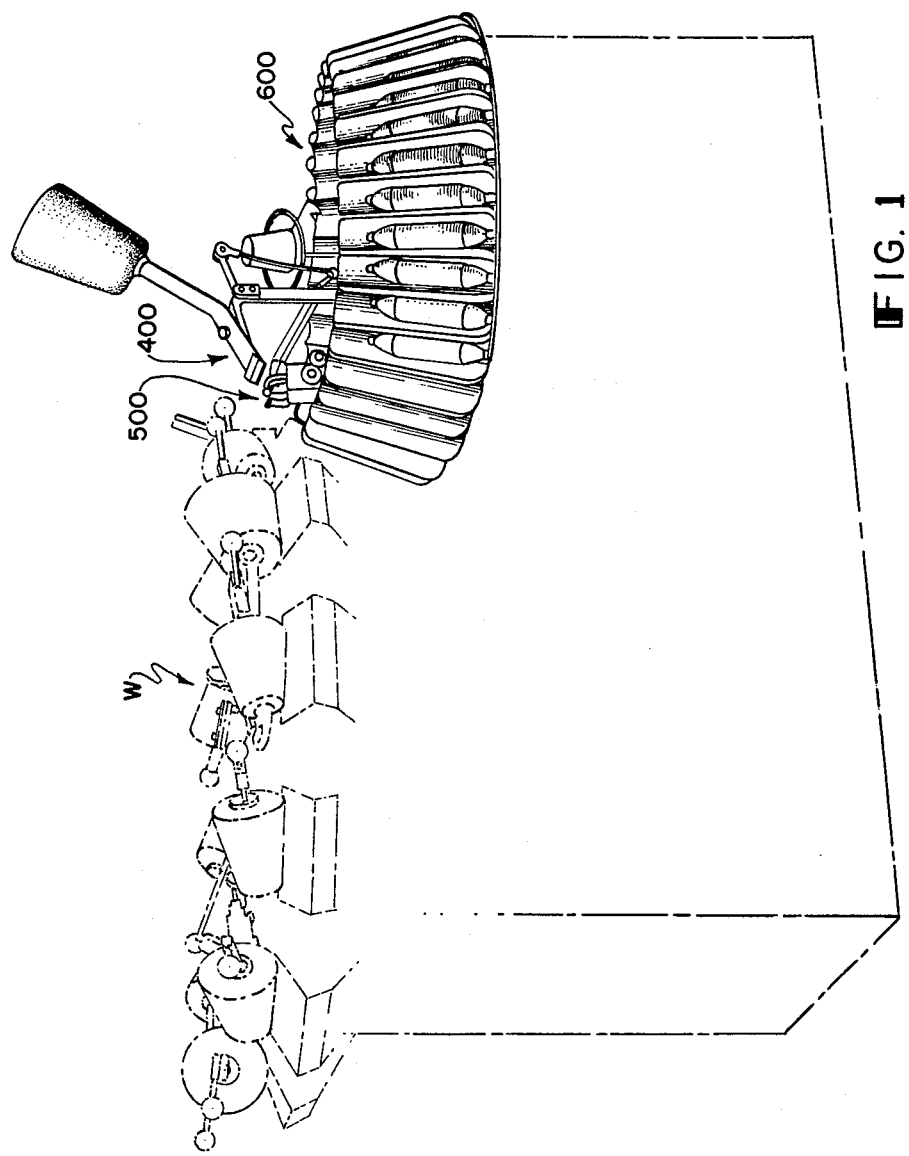
FIG. 1 is a schematic perspective view intended primarily to locate the tending mechanism of the machine with reference to a plurality of winding units which are moved past the tending mechanism.

The winding mechanism, indicated generally at W, FIG. 1, includes 12 winding units or heads 51, FIG. 2, carried by a table 52 which is driven in intermittent 30° steps by Geneva mechanism subsequently described.

Figure 30:
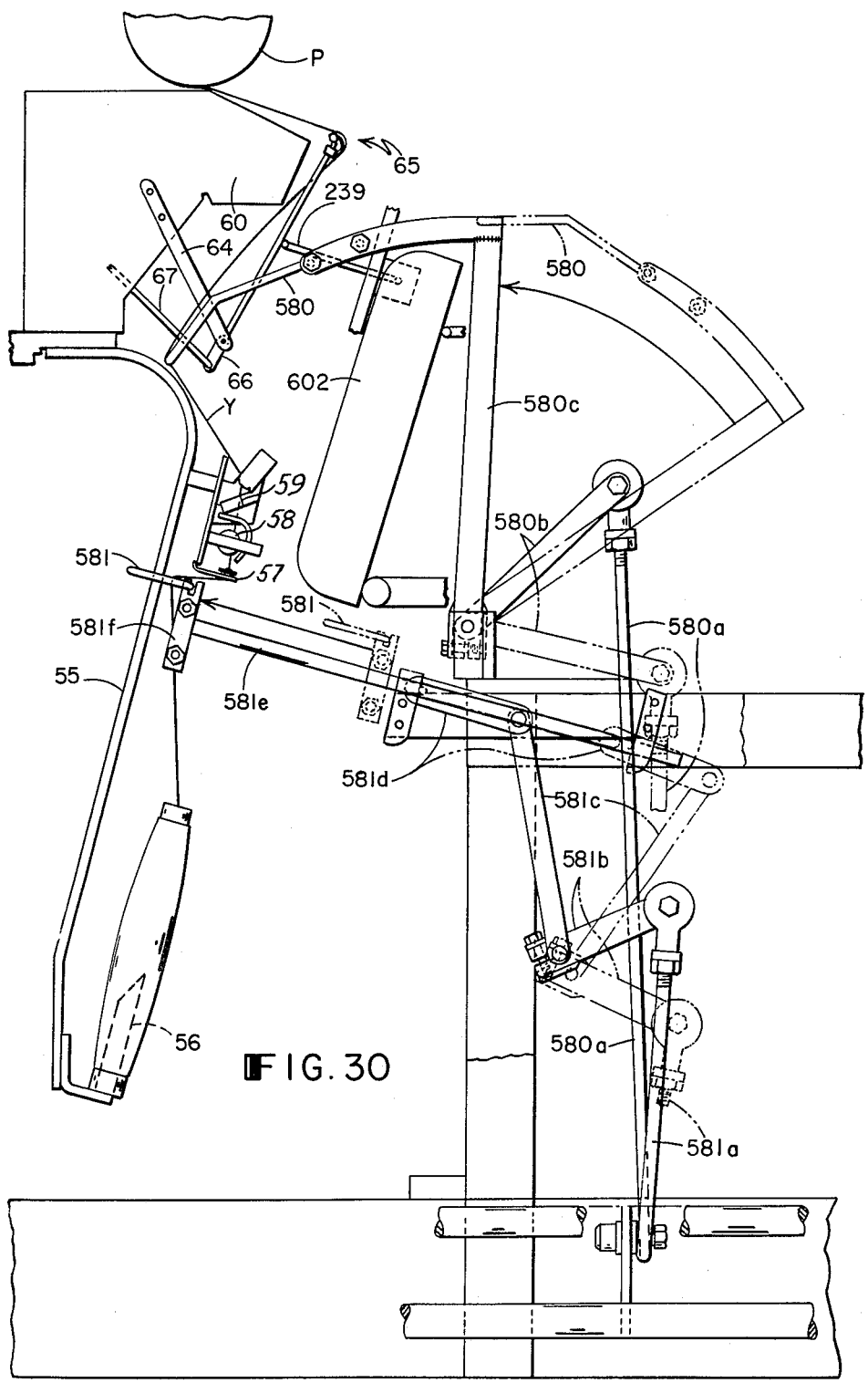
FIG. 30 is an elevation, taken from the same point of view as FIG. 24 showing yarn-pushing mechanism of the tending mechanism.

Each head 51 may carry a depending frame member 55, FIG. 30, carrying a peg 56 for the unwinding bobbin and suitable guides 57, tensioning means 58 and a slub catcher 59. The winding head includes spaced side plate members 60, 61 connected by various cross connections, FIGS. 5, 6 and 7. Brackets 64 carry a pivoted yarn detector 65 having a crank arm 66 connected by a link 67, FIG. 11, to a stop mechanism.

Although the winding head may be provided with a grooved package-driving roll that also traverses the winding yarn to distribute it on the winding package, the preferred head shown has separate yarn-traversing and package-driving means.

FIG. 6 illustrates the grooved traverse cam 70 mounted in bearings in the side plate 60, 61 for operating a yarn-traversing thread guide 72 in known manner. The notable feature of the traverse cam mechanism shown in FIG. 6 is the provision for limited endwise movement of a shiftable sleeve 75 that carries one conical half 76 of a V-pulley of which the other conical half 77 is connected to drive the cam 70. A button-like central member 79 when pushed to the right in FIG. 6 by connections subsequently described, forces the shiftable pulley half 76 toward the other pulley half against the resistance of an intervening drive belt 97 (FIG. 4), forcing the belt to a larger radius of action on the pulley and hence slowing down the cam. Since the winding package is driven at a constant surface speed, this variation of the traverse cam speed will disrupt synchronism of traversing and winding speeds and so can be used to prevent "ribbon winding."

The package driving means of FIG. 7 includes a drum 85 driven by pulley 86 and extending under most of the length of the winding package. Freely rotatable relative to the drum, a loose roll section 88 supports the tip portion of a conical winding package (when as usual the package is conical) and so avoids objectionably fast movement of a driving surface past the smaller-diameter portion of a conical package. The lengthwise extents of the loose section 88 and the driven drum section 85 may be varied as appropriate, and for cylindrical packages the driven drum section may engage the whole length of the package and the loose roll section 88 may be omitted.

The winding package is received between the two arms of a generally U-shaped yoke 90, FIGS. 8 and 9. The left of these arms carries a rotatable socket 91 for the conical tip of a paper cone C, the socket turning in a ball bearing 91a. Slidably mounted in a boss 92 at the end of the other arm of the yoke a shaft 93 carries a disc 94 turning on a ball bearing 94a. Disc 94 carries a rubber ring 95 engageable with the interior surface of the cone. Shaft 93 is yieldingly urged to the left by a lever 96 which is pivoted at 97 and biased by a spring 98. The disc 94 may be withdrawn from the cone to release the cone by swinging the lever 96 by its handle 96a. The handle and lever can also be used to raise and lower the cone.

For assuring a continued increase in taper of the winding package even as it approaches a large diameter, the yoke 90 is constrained to rotate around an axis that is inclined relative to the package drive roll axis. The yoke 90 is clamped by extensions 99 to a rod 100, FIG. 8, which is supported, FIG. 4, by bearings 101a and 101b in which the rod 100 can both rotate and move lengthwise. These bearings define an axis for rod 100 which is inclined to the axis of the package drive roll the rod axis where it approaches 101a being more remote from the package drive roll axis than where the rod axis approaches 101b. The amount of this inclination can readily, as in the machine illustrated, be made such that the cone axis continually increases its inclination to the drive roll axis as the package grows. The drive roll axis is indicated at 85X.

Reference has been made to the rod 100 being capable of sliding in the bearings 101a and 101b. This is for the purpose of retracting the winding cone in the direction of its larger end as the winding progresses. A bracket 104 movable with the yoke 90 carries the inner element of a spherical bearing 105. A stud 106 fast on the frame of the winder head carries the inner element of another spherical bearing 108. The two other elements of the two spherical bearings are coupled by a tie-rod 109. Thus bearing 105 is constrained to move in an arc around bearing 108 as the winding package grows. As the yoke 90 rises it and its rod 100 must shift to the right in FIG. 8 and when a new empty cone is applied, and the yoke is lowered to place the cone on its drive roll the yoke is restored to the left.

Figure 2:
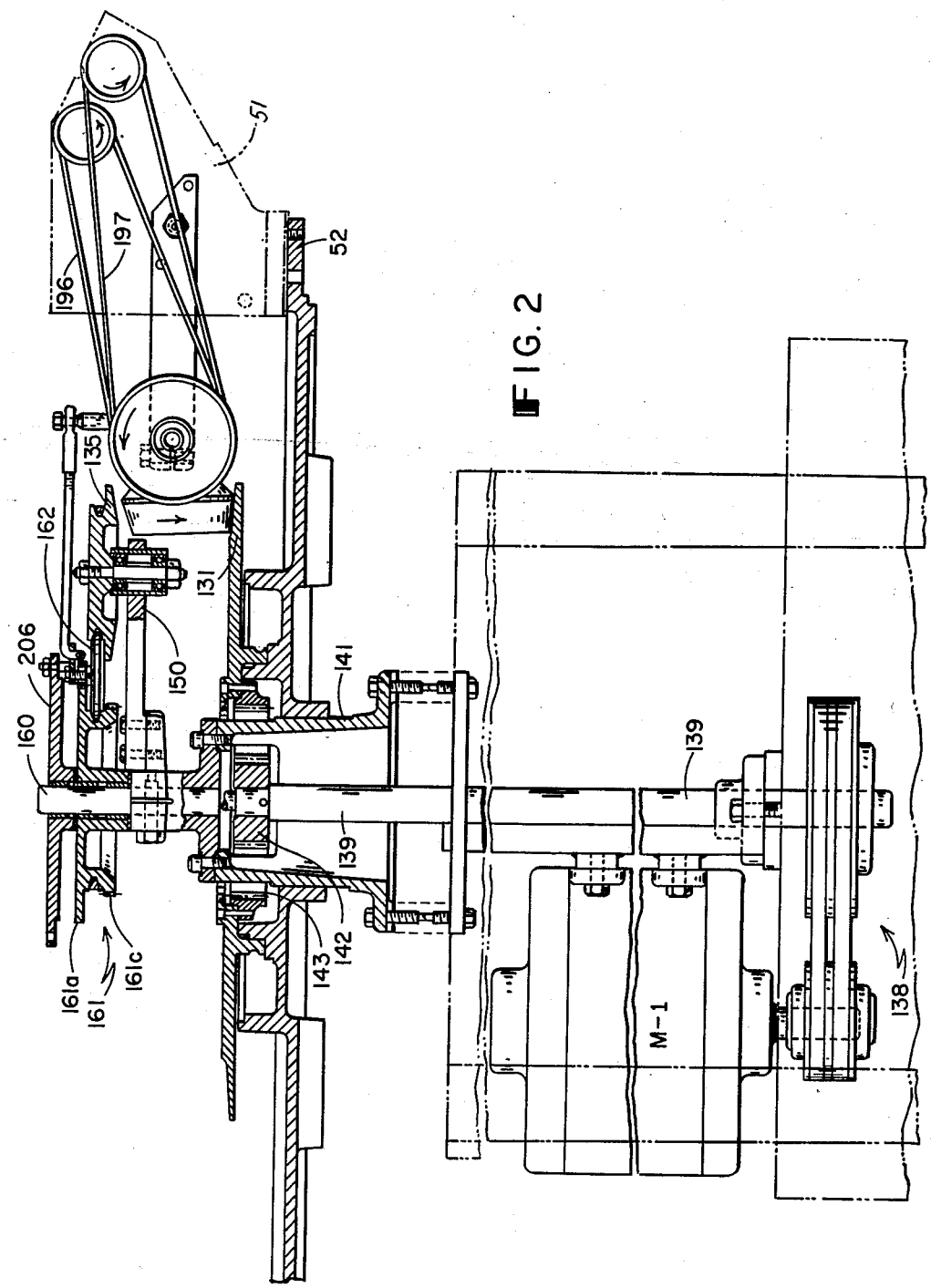
FIG. 2 is a view mainly in vertical section taken through the axis of the rotary table which carries the winding units, also indicating one of the winding units.

The normal winding driving motion for the winding unit is derived from a continuously rotating drive disc 131, FIG. 2, which is coaxial with the table 52 and which has its operative driving surface facing upwardly. A reverse or unwinding driving motion is derived from a smaller reverse drive disc 135 which is positioned to serve a winding unit which is in the position of FIG. 2, which may be called the twelve o'clock position.

Drive of the discs 131 and 135 is from a motor M–1 through belt and pulley connections 138 to a vertical shaft 139 which is non-concentric with the disc 131, being displaced in FIG. 2 backwardly away from the observer from the axis of this disc and the axis of a central housing 141. Near its upper end shaft 139 carries a pinion 142 which meshes with an internal gear 143 on the disc 131, the pinion 142 extending out through an opening in the housing 141 to make this engagement with the internal gear.

Figure 3:
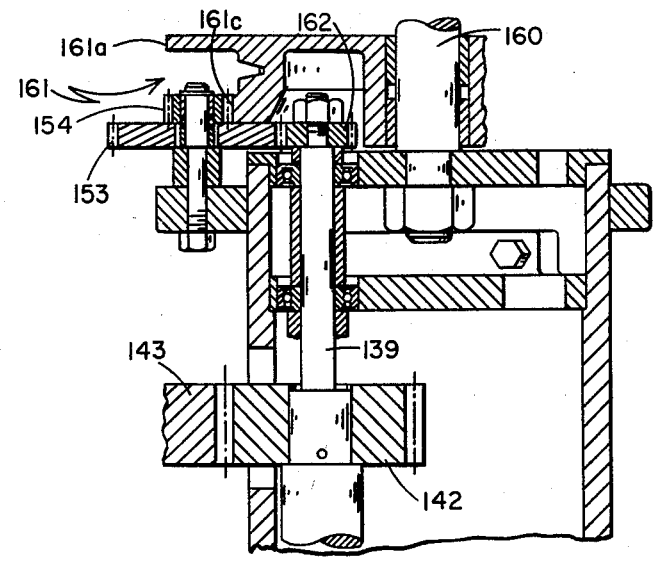
FIG. 3 is a fragmentary vertical section taken through the same vertical axis as is FIG. 2, but looking from left to right in FIG. 2.

The reverse driving disc 135, whose shaft is carried in a bracket 150 mounted on the housing 141 is driven by a system of connections comprising a pinion 162, FIG. 3, at the top of shaft 139, a gear 153 meshing therewith and carrying a pinion 154 which meshes with the gear portion 161c of a combined gear, pulley and cam 161 which turns on a central stub shaft 160. The pulley portion 161b of the combined gear, pulley and cam drives the upper or reverse driving disc 135 through a belt 162a.

Figure 4:
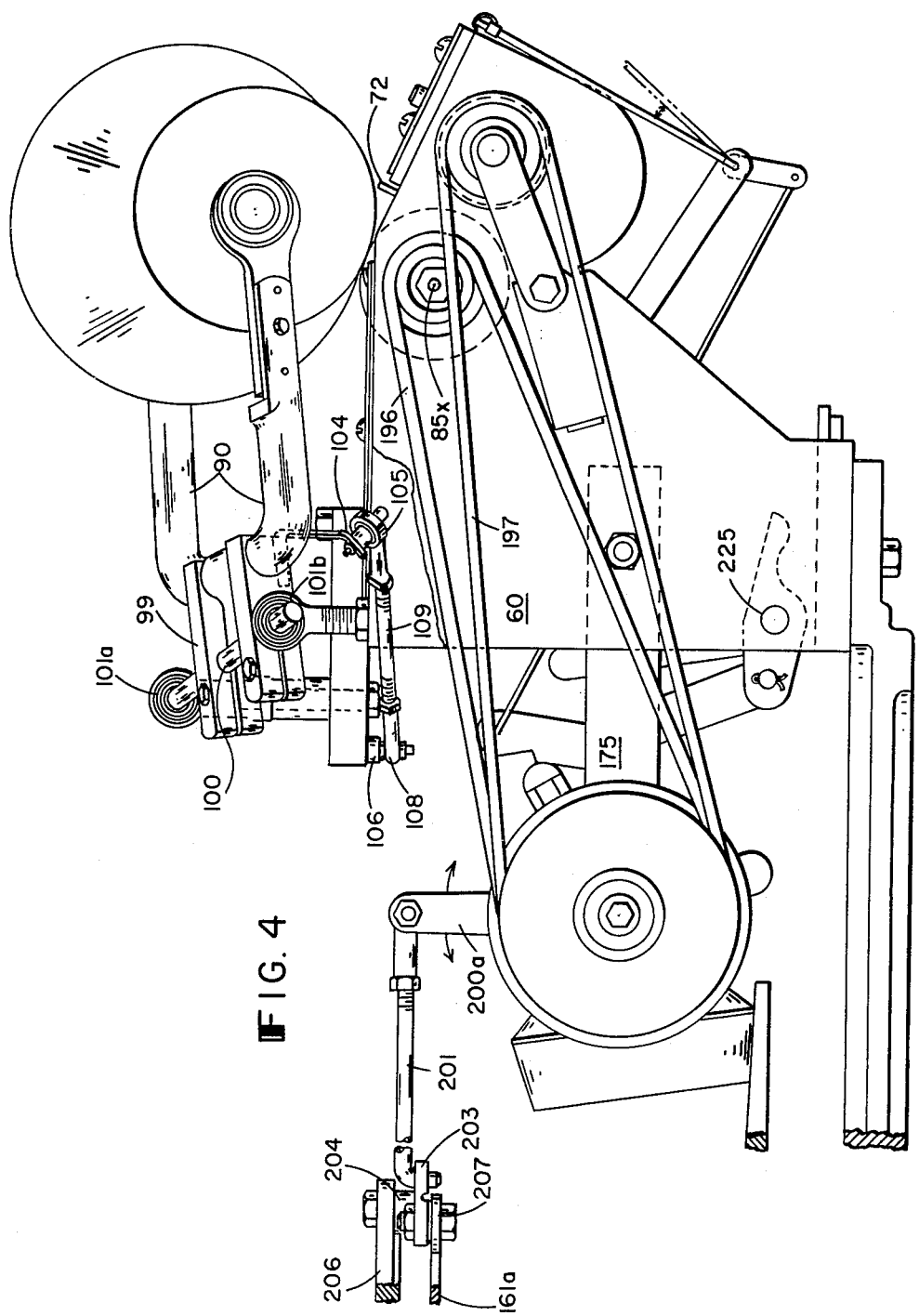
FIG. 4 is an elevation showing one of the winding units in more detail.
Figure 5:
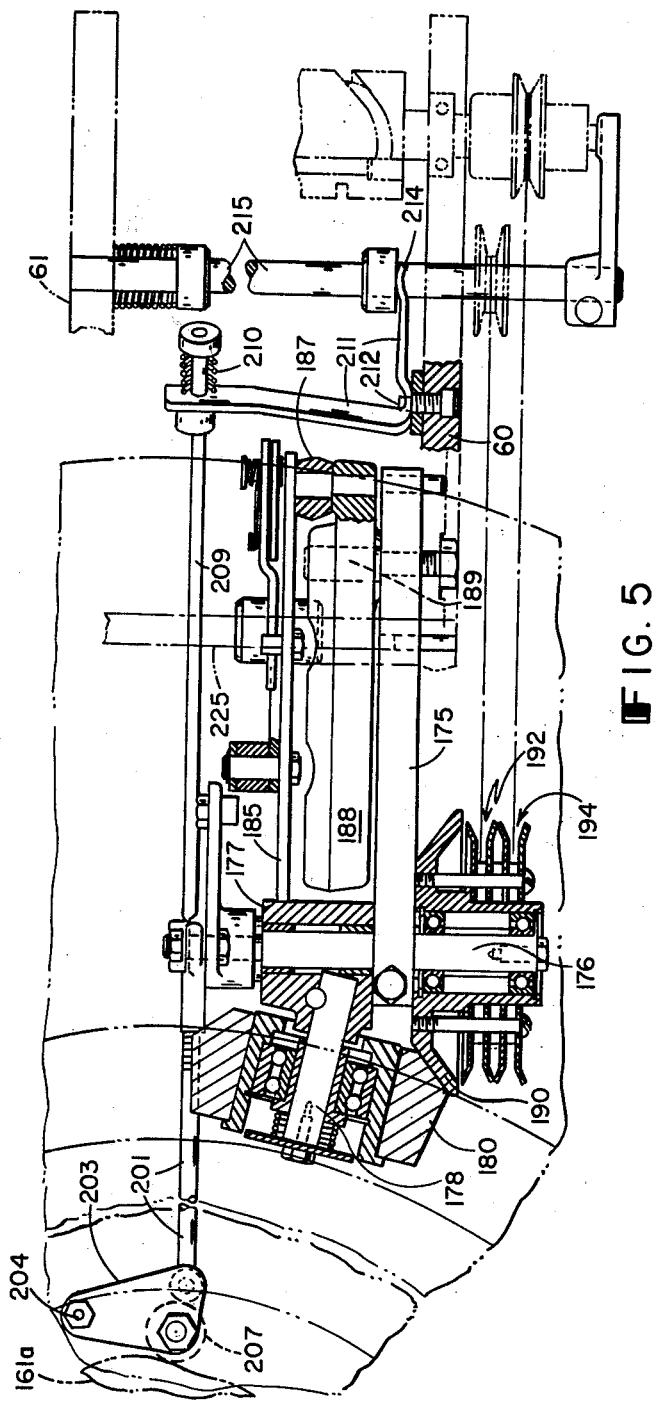
FIG. 5 is a diagrammatic view partly in plan and partly in section, with some parts broken away, showing a winding unit.

Returning now to a winding head, FIGS. 4 and 5, an arm 175 affixed to the frame plate 60 carries a cross shaft 176 on which is rotatably mounted a sleeve 177 carrying a shaft 178 for a rotatable conical pulley 180.

By rotation of the sleeve 177 to different positions about cross shaft 176 conical pulley 180 may either engage the lower driving disc 131, or may engage the upper reverse driving disc 135 (when the winding unit is in the twelve o'clock position where this disc 135 is effective) or may have an intermediate position not engaging disc 135 and yet not sufficiently elevated to meet with disc 135 until further raised.

Sleeve 177 which determines the position of conical pulley 180 has an arm 185 extending therefrom which controls its position. A link 187 pivotally connects arm 185 to a weight bar 188, FIGS. 5 and 10, which is pivoted at 189 relative to the frame of a head, thus tending to maintain conical wheel 180 in drive-receiving contact with the lower disc 131.

Conical wheel 180 frictionally engages a conical wheel 190 which has fast thereto pulleys 192 and 194 for driving the package drive roll 85 and traverse cam 70 respectively through the V-belts 196 and 197. Rotation of drive roll 85 by engagement of the pulley 180 with lower disc 131 rotates the winding package in the winding direction. Rotation of the drive roll 85 when the pulley 180 is engaged with the upper drive disc 135 rotates the package in unwinding direction in aid of finding a broken yarn end on the package.

A three armed lever 200, FIG. 10, having arm 200a, 200b and 200c is pivoted on shaft 176 and receives a rocking movement. Upper arm 200a is connected by link 201 to a piece 203 which is pivoted at 204 to a disc 206 which is freely rotatable on a stub shaft 160. A cam follower roll 207 on piece 203 bears against the cam surface 161a of the combined gear, pulley and cam 161. Since this cam surface turns continually at a speed different from that of the intermittent advance of the winding unit, a rocking motion is thus imparted to the three armed lever 200 of each winding unit.

The lower arm 200c is connected by a rod 209 and spring 210 to a crank 211, FIG. 5, which is rockable at 212 and which in turn bears upon a collar 214 fast on a rod 215 which is slidable in the winder unit frame and which extends through plate 60 and carries an arm 216. Arm 216 bears upon the previously mentioned button-like member 79 of the traverse cam assembly, and by its in and out motion produces a similar motion of member 79 for variation in the speed of the cam.

The middle arm 200b serves as an element of linkage to swing the arm 185 and wheel 180 to an intermediate non-driving position upon breakage or exhaustion of the yarn. A lever 219a, FIG. 11, pivoted at 220 to arm 185 is controlled through link 67 by the yarn detector 65 and is allowed to swing into the path of arm 200b when the yarn detector swings out, whereupon arm 200b acts through lever 219a to swing arm 185 slightly clockwise around pivot 176. A latch lever 224 pivoted at 225 then drops over a projection 226 (which is on the rear side of arm 185 as seen in FIG. 11) and latches the lever 185 in the intermediate non-driving position shown in FIG. 12.

Figure 14:
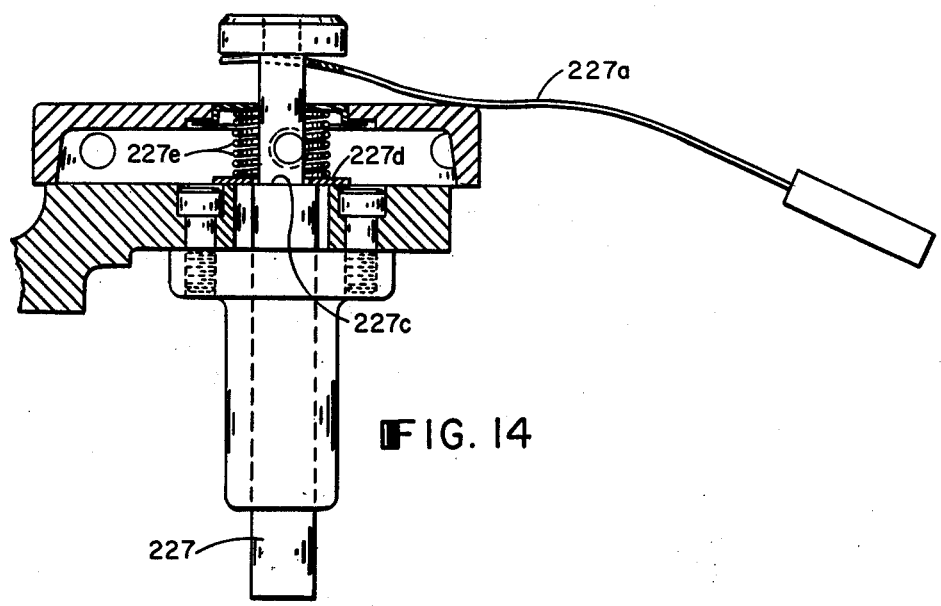
FIG. 14 is a detailed view mainly in vertical section showing the mounting of an indicating and controlling pin of a winding unit.

A pin 227 which serves both to control automatic tending mechanism and also to function in controlling the winding unit, extends down through the table and is normally held depressed by the right end or nose of a lever 229 which is pivoted at 225 and connected at its left end to the lower end of a link 219 which has the same pivot 220 on arm 185 as lever 219a. Movement of the lever 185 to the intermediate non-driving position thus raises the right end or nose of lever 229 allowing the pin 227 to rise slightly. This slight rise of pin 227 may be brought about by a lever 227a, FIG. 14, having a left end portion extending under the head of the pin and having a weight 227b at its right end, adapted to lift the pin until a shoulder 227c thereof abuts a washer 227d which is backed up by a compression spring 227e. The raised pin will indicate to the automatic tending mechanism that this unit, having the raised pin, is to be tended.

Figure 12:
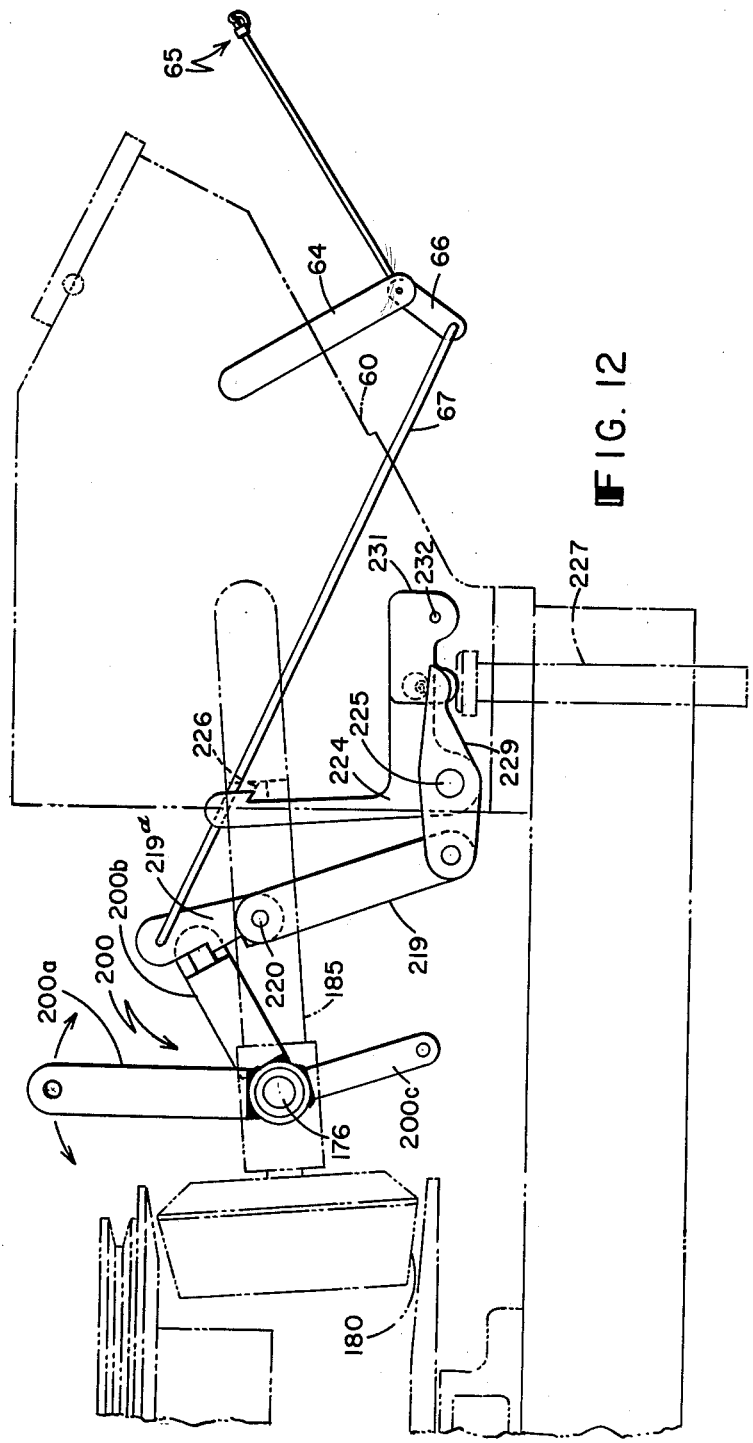
FIG. 12 is similar to FIG. 11 but shows the winding unit in an inactive non-winding condition.
Figure 13:
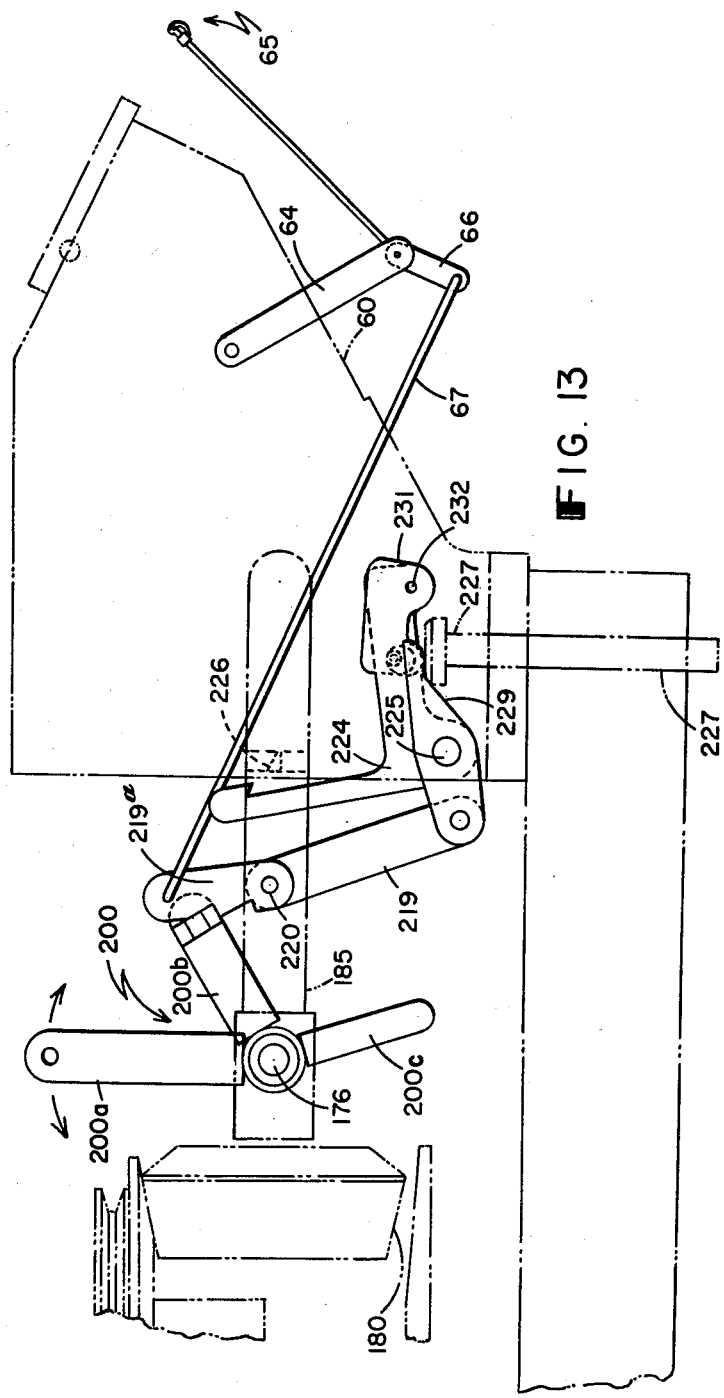
FIG. 13 is similar to FIGS. 11 and 12 but shows the winding unit being driven in an unwinding direction.
Figure 16:
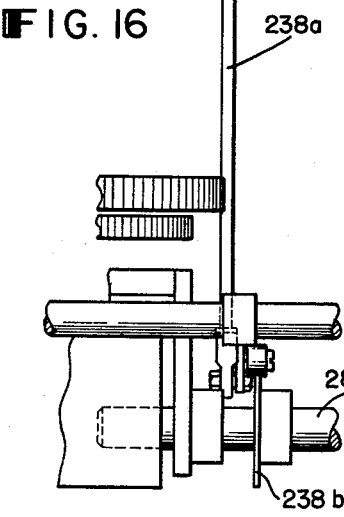
FIG. 16 is a diagram in the nature of an elevation of mechanisms for controlling winding units to cause them to be driven in the reverse direction, stop, and then be driven in the winding direction.
Figure 17:
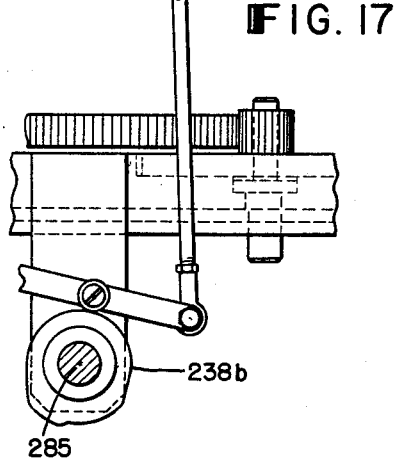
FIG. 17 is a view taken from the right side of FIG. 16.

Skipping for the moment the structure of the mechanism for detecting the condition of the winding unit according to the position of its pin 227, and assuming that the pin is in the slightly raised position of FIG. 12 which calls for tending, the tending mechanism will in this case automatically raise a pivoted plate 238, FIGS. 16 and 17, which acts upon the bottom of the pin 227 to force it upwardly still further, this time against the resistance of spring 227e. The head of pin 227 then acts on the nose of lever 229 to cause lever 229 to pull down on link 219 thus pulling arm 185 further clockwise around pivot 176, bringing the conical wheel 180 into contact with upper disc 135 for reverse driving of the yarn package. The head of pin 227 also acts on a lever 231, FIG. 13, which is pivoted to latch lever 224 at 232 to throw the latch lever to unlatched position. Lever 231 has a pin and hole connection with latch lever 224 permitting limited relative movement of these parts about pivot 232, a pin 231a carried by lever 231 extending through a somewhat larger diameter hole 224a in the latch lever. A spring 231c, FIG. 11A, acting on the pin 231a tends to restore lever 231 to its position relative to latch lever 224 such as shown in FIGS. 11 and 12.

Thus as pin 227 is moved up by the tending mechanism energy can be stored in the spring for swinging the latch lever 224 to unlatched position as soon as projection 226 has moved down far enough to disengage the beak of the latch lever.

After the end-finding operation, the tending mechanism slightly lowers the plate 238, allowing the arm 185 to resume its intermediate position in which the package is not driven, and finally lowers the plate further to allow the arm 185 to lower further and permit winding to start.

The plate 238 which controls the position of arm 185 is normally in a lowered position so as not to act on any pin 227 which is in the lowered normal winding position. Plate 238 is operated through a yielding connection by a push rod 238a (FIGS. 16 and 17) which is raised by rotation of a cam 238b on shaft 285 of the tending mechanism. As will appear farther along this shaft operates only in those instances when a unit is to be tended.

While at the twelve o'clock or tending position the detector 65 is held in a raised position by a non-travelling wire 239, FIG. 30, so that when the unit leaves this twelve o'clock position it will be in the running condition of FIG. 11.

*Geneva drive and control of automatic tending*

Since the machine employs three clutches 240, 241 and 242 of a generally similar nature it may be well to describe these clutches generally before describing other elements of the control mechanism.

Figure 18:
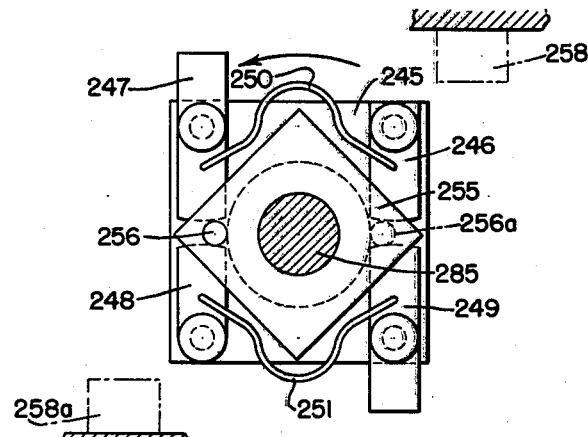
FIG. 18 is a general view explanatory of the construction and operation of clutches in the machine.

Referring to FIG. 18 such a clutch, intended to rotate in the direction indicated, may have a pawl carrier element 245 having pivoted thereto alternate tail-less and long-tailed pawls 246, 247, and 248, 249, the long-tailed pawls having their tails in the trailing direction. The pawls are urged inwardly by spring wires 250 and 251 which interconnect pairs of pawls. The tailless pawls are to prevent overrunning.

A pin carrier element 255, in the simplest case, carries a single pin 256 adapted to be engaged by the forward face of either long-tailed pawl, to be driven thereby. A movable stop element, represented by 258, in the path of the long tail will trip a long-tailed pawl and withdraw it from the pin and de-clutch the drive. With a single pin 256 and with a single stop element normally in the path of the long tails, the clutch will function as a one revolution clutch. Removing the stop element long enough to allow a pawl to pick up the pin will drive the pin carrier through one revolution.

The clutches referred to as 240 and 242 operate in this manner.

With a second such pin 256a added, with the stop member 258 normally removed from the pawl path, and with a second stop 258a permanently positioned to trip a pawl at approximately 180° from the position at which a pawl may be tripped by movable stop 258, such a clutch will normally drive continuously. Then if the movable stop member is operated to trip one long-tailed pawl while the other long-tailed pawl is in tripped position in passing the permanent stop 258a, the pin carrier will skip one-half revolution. The clutch referred to as 241 is operated in this manner.

Figure 22:
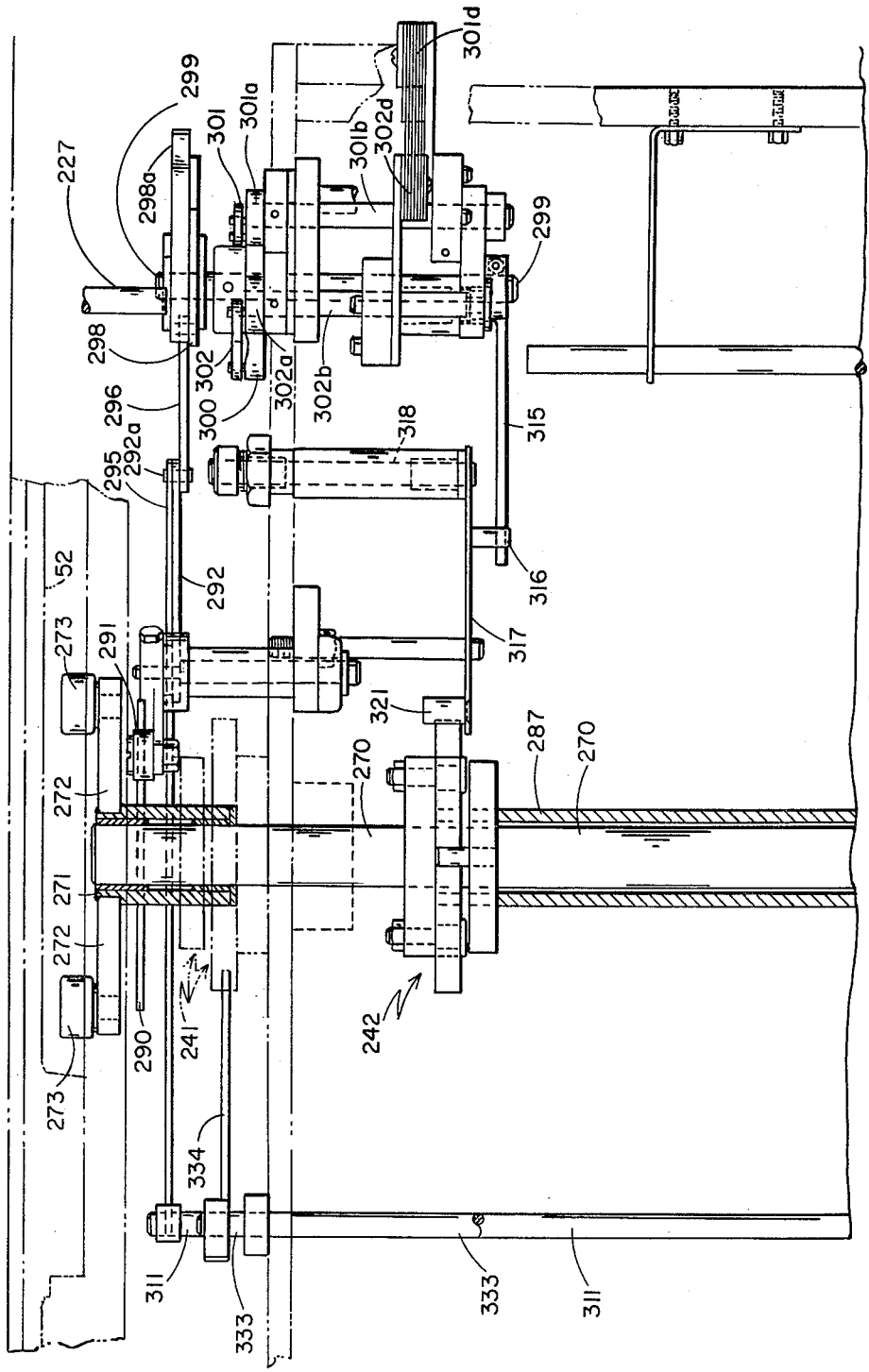
FIGS. 22 and 23 are diagrammatic views in the nature of elevations, showing respectively upper and lower portions of feeler and clutch control mechanism of the machine.
Figure 23:
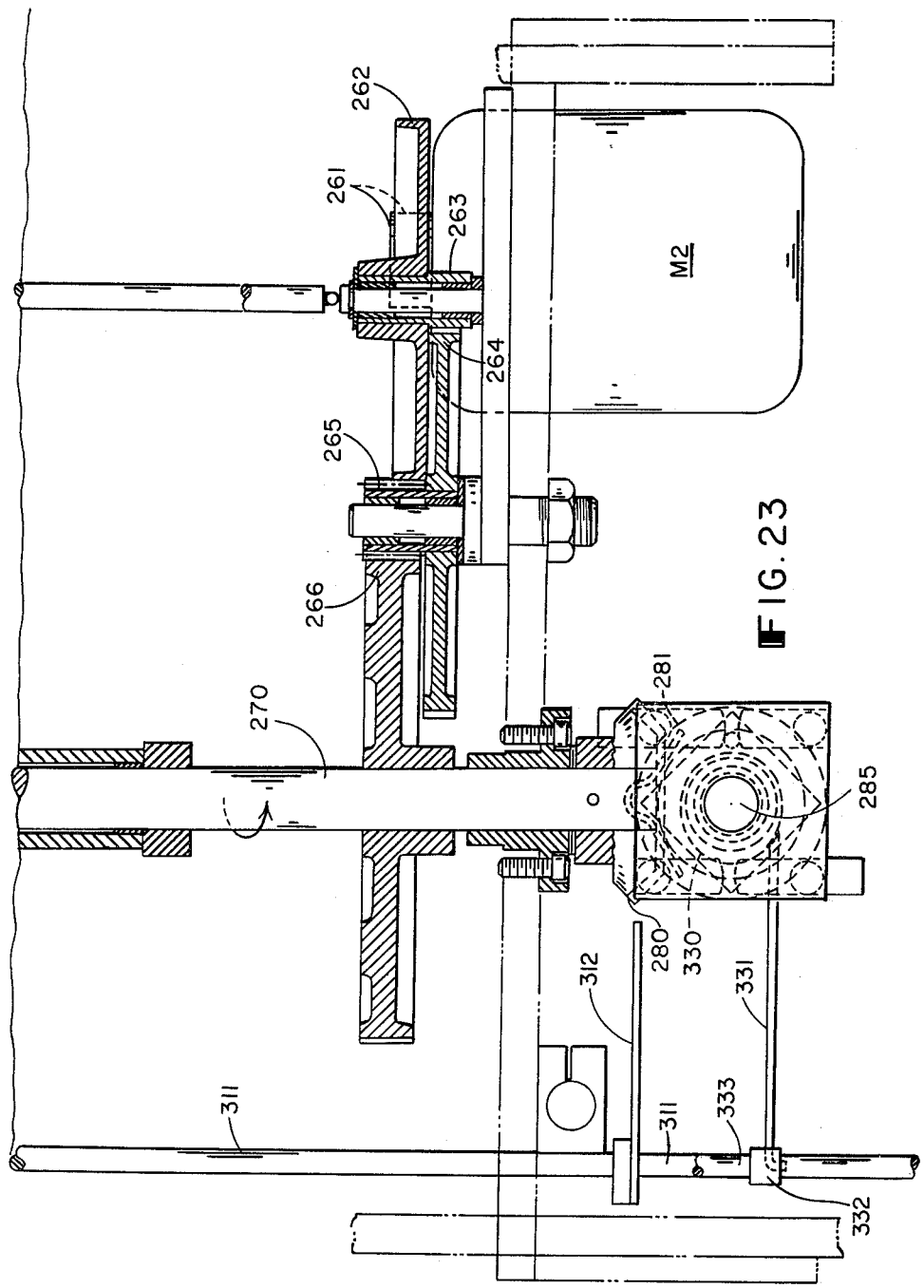

The drive to the table 52 is from a motor M-2, FIG. 23, through pulley 261, friction drive wheel 262, pinion 263, gear 264, pinion 265, and vertical shaft 270. Shaft 270, FIG. 22, is normally coupled by clutch 241, operated as described above, to a sleeve 271 which carries oppositely directed crank arms 272 carrying Geneva drive rolls 273. These rolls enter the Geneva grooves in the underside of the table 52, each roll 273 advancing the table 30° each time it engages one of the Geneva grooves.

Figure 19:
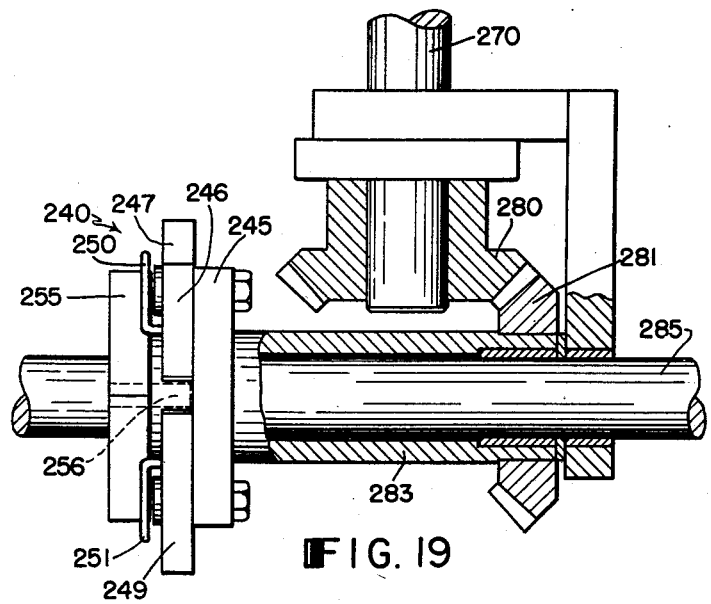
FIG. 19 shows one of the clutches, this view being taken at right angles to FIG. 18, and also shows this clutch as serving to connect a vertical drive shaft with a horizontal cam shaft in the tending mechanism.

At its bottom end the shaft 270 is connected through bevel gears 280 and 281, FIG. 19, to a sleeve 283 carrying the pawl carrier 245 of clutch 240, the pin carrier 255 of this clutch being fast on a horizontal cam shaft 285. This shaft 285 is operated through the clutch 240 each time that a winding unit requires to be tended, regardless of whether a new bobbin requires to be supplied.

The vertical shaft 270 also carries the pawl carrier 245 of the clutch 242, FIG. 22, the pin carrier 255 of this clutch being carried by a sleeve 287 which is rotated through clutch 242 one revolution in those instances in which the bobbin is required to be changed.

The sleeve 271 which is driven by clutch 241 carries a cam 290, FIGS. 22 and 20, against the surface of which a cam-follower roll 291 is yieldingly drawn. As the cam-follower roll moves toward the center of the cam, as permitted by the cam surface, a system of linkage operates. Motion of this linkage can be blocked, short of full movement, by two possibilities, first, by the pin 227 of the winding unit which is at the eleven o'clock position being in the depressed position, and second, by yarn being encountered by yarn feeling mechanism. In the first situation, the winding unit is allowed to continue running without the tending mechanism affecting it. In the second situation, where the winding unit is not running but yarn is present, so much of the tending mechanism as is appropriate to this situation will operate, particularly clutch 240, shaft 285 and mechanism driven thereby.

In the further situation in which the linkage is not blocked but has its full motion, the additional portions of the tending mechanism concerned with changing the supply bobbin are operated, particularly the clutch 242, sleeve 287 and parts operated thereby.

Operation of the tending mechanism, either with or without supply of a new bobbin is accompanied by operation of the clutch 241 to skip one-half a revolution of the sleeve 271 and Geneva drive, with the result that after the winding unit has been advanced to the twelve o'clock position where the tending operations take place the table is caused to dwell considerably longer than usual. The skipping of this half revolution also suspends operation of the cam 290 and certain control functions initiated by this cam.

*Feeler and clutch control mechanism*

The cam follower 291 is carried by a bell crank 292 having a lug 293, all of which are biased in a clockwise direction, FIG. 20, by a spring 294. At 292a the bell crank is pivotally connected to links 295 annd 296. Link 295 serves as a connection to clutch 240. Link 296 serves as a connection to feeler mechanism. Link 296 is pivotally connected at 297 to an arm 298 which is fast on a shaft 299. Shaft 299 also carries a two armed crank 300 whose opposite ends are connected by links 301, 302 to crank arms 301a, 302a which are fast on shafts 301b, 302b. Arms 301c and 302c which are fast on these shafts carry stacks of vertically spaced feeler fingers 301d, 302d which are adapted to intermesh as indicated in FIG. 22.

When a winding unit reaches the eleven o'clock position its yarn, if present, extending from its bobbin up to its slub catcher, will lie in the region where these fingers tend to intermesh.

The rotation of cam 290 and the action of spring 294 will tend to allow the arms 301c and 302c to swing from behind the upright of the winding unit to the position of FIG. 20, and if the fingers encounter no yarn they will intermesh as shown. If the fingers do encounter yarn, the yarn blocks the fingers from intermeshing, this condition being shown in FIG. 20A; and the cam follower 291 is prevented from fully following the drop in the contour of cam 290. This condition calls for retying the yarn of the winding unit.

The condition in which the fingers intermesh calls for change of the winding bobbin in addition to tying the end from the yarn package onto the new end of yarn.

However, most frequently the winding unit will be winding when it reaches the eleven o'clock position. Its pin 227 will be fully down. In this situation the lower end of the pin blocks a plate 298a which is fast to the arm 298, as shown in FIG. 21, and so blocks the linkage from moving the fingers 301d and 302d into detecting engagement with the yarn.

The three situations and corresponding conditions of the linkage have the following results. Link 295, as indicated, controls clutch 240. This control is through connections comprising a crank 310, FIG. 20, shaft 311 and crank 312, the end of which constitutes the previously described movable stop element (represented by 258 in the description of clutches) for the clutch 240.

When a winding unit is running at the eleven o'clock position the crank 312, acting as a stop trips the clutch 240 thereby preventing drive of the horizontal cam shaft 285.

When a winding unit is not winding at the eleven o'clock position, the plate 290a not being blocked by pin 227, the crank 312 is out of range of the pawls of the clutch, allows engagement of the clutch and permits the horizontal cam shaft to be driven. This occurs whether the fingers 301d and 302d meet a yarn or fail to engage a yarn.

The feeler mechanism distinguishes between detection and non-detection of a yarn as follows.

A crank arm 351, FIGS. 20 and 22, which turns with shaft 299 is adapted to engage a pin 316 on a crank arm 317 which turns with a shaft 318. Arm 317 is biased toward the clockwise direction by spring 319 acting on a crank arm 320 on shaft 318, but is moved counterclockwise by the action of arm 315 on pin 316. A pin 321 on arm 317 constitutes the movable stop element represented by 258 in the description of clutches, for the clutch 242. This stop element is normally in position to trip the long-tailed pawl of clutch 242 and prevent operation of the clutch, but by movement of the linkage to the intermeshed condition of the fingers 301d and 302d of FIG. 20 the stop element is removed from the path of the pawls and clutch 242 is allowed to engage and drive the cam-carrying sleeve 287. This does not occur if the fingers are blocked from intermeshing by encountering a yarn as in FIG. 20A.

Clutch 241 is omitted from the illustration of the mechanism in FIG. 20 because, lying at a level between cam 290 and clutch 242 its illustration would unduly obscure both. This clutch as mentioned normally connects a vertical shaft 270 to the sleeve 271 which drives the cam 290 and Geneva drive for the table.

Upon rotation of horizontal cam shaft 285 an eccentric 330 thereon operates through a link 331, crank arm 332 shaft 333 and crank arm 334 (which latter constitutes the movable stop element represented by 258 in the description of clutches) to move into the pawl path of clutch 241. In FIG. 20 the full line showing of arm 334 represents its normal position in which it does not trip the clutch 241 and the broken line showing represents the clutch-tripping position to which it is brought by the eccentric 330 after the cycle of rotation of horizontal cam shaft 285 has been initiated by detection of nonwinding of a unit at the eleven o'clock position.

Each half revolution of the shaft 270, sleeve 271, Geneva drive 272, 273 and control cam 290 in which the detecting mechanism detects need for tending is followed by a half revolution of shaft 270 during which the sleeve 271, Genva drive and control cam 290 do not turn. The non-turning of cam 290 suspends or suppresses detection. On the other hand, the more usual situation is that the Geneva drive and the control cam will rotate continually.

*Bobbin-end carrier mechanism*

Figure 36:
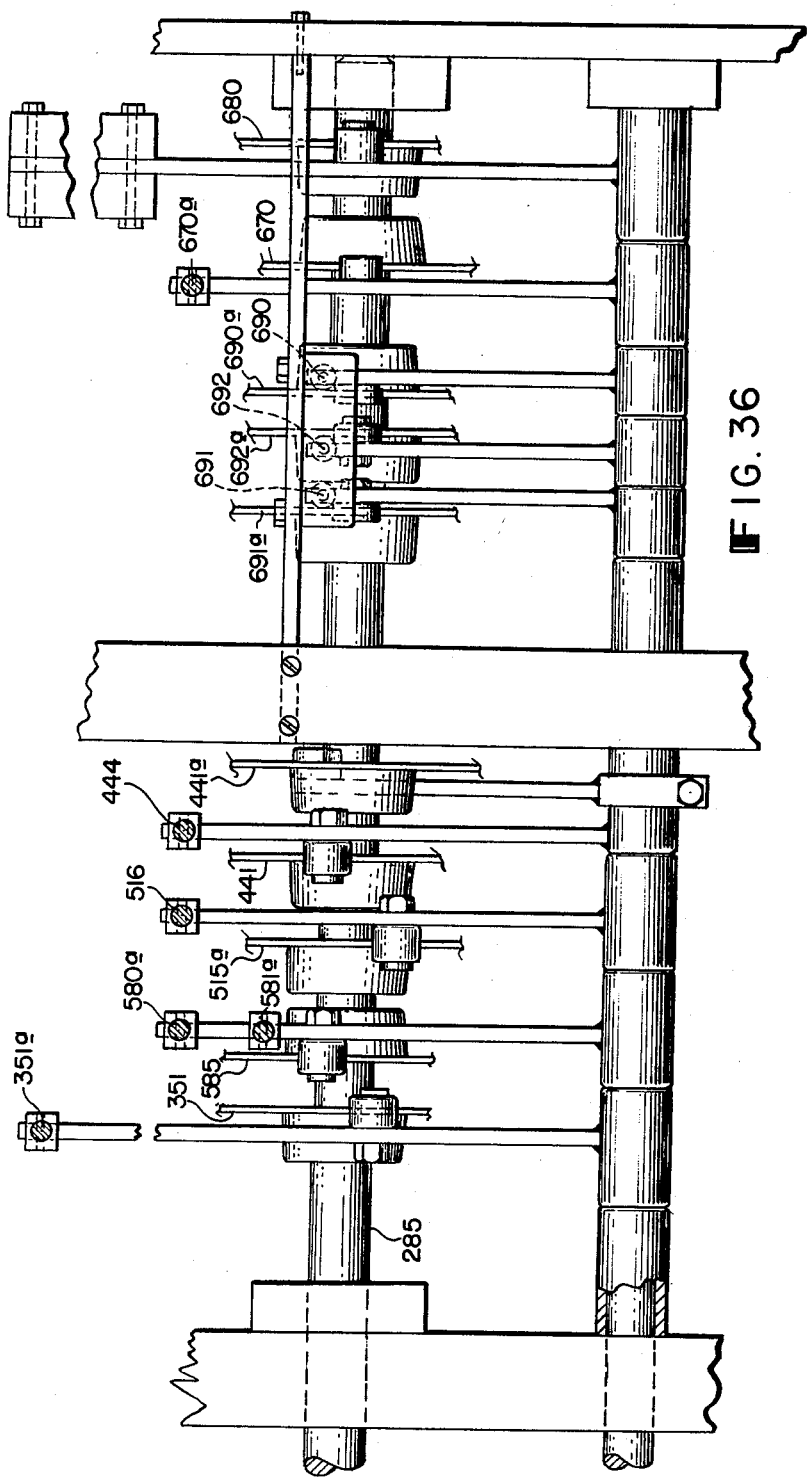
FIG. 36 is a diagram in the nature of a plan showing cam-operated rods and valves.

In the case of detection of a non-running winding unit a normally inactive bobbin-end carrier mechanism is operated by a cam 351, FIG. 36, on the horizontal cam shaft 285.

Figure 25:
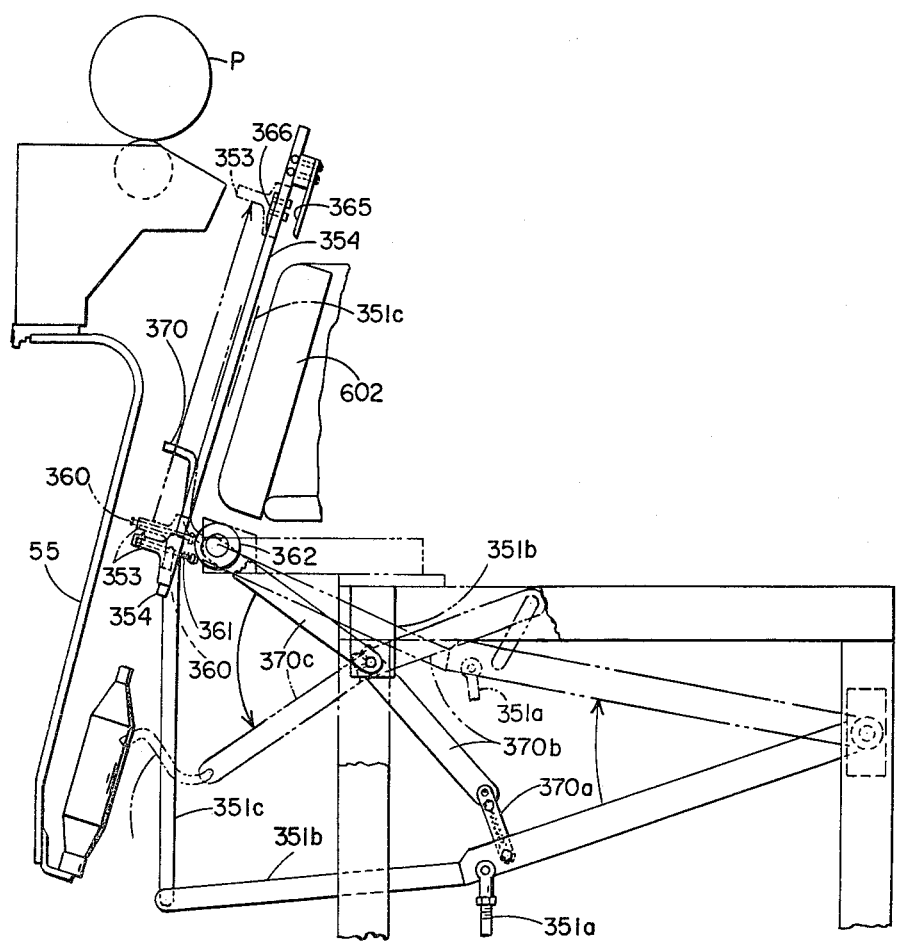
FIG. 25 is a diagram showing bobbin yarn end carrier mechanism and associated parts.

This carries mechanism shown in FIGS. 25, 26 and 26A includes a yarn carrier slider 353 movable on a guide track 354 from a position adjacent to the path of yarn on the winding units traveling from eleven o'clock to twelve o'clock position, up to an elevated position of the slider 353. The slider 353 will engage a yarn which has broken and which has caught in the slub catcher of the winding unit.

The slider is provided with a curved guiding surface 355 adapted to deflect a yarn toward the winding unit as the yarn approaches the region of a pin 360. Pin 360 is normally held retracted in a recess in the slider by a spring 361, so as not to disturb a yarn of a running winding unit. When linkage comprising lifter rod 351a, lever 351b and link 351c is operated by the cam 351 the slider 353 is raised and in the initial rise the pin 360 meets a roll 362 which projects the pin, as shown in broken lines in FIG. 26A, causing it to catch the yarn extending down from the slub catcher. The pin then retracts in leaving the roll 352, gripping the yarn under the conical head of the pin. As the slider 353 rises a pivoted yarn plow member 370 is swung down to assist in withdrawing further yarn from the bobbin to provide a length appropriate for holding the yarn in position to be received by a knotter.

The yarn plow 370 in moved with the bobbin-end carrier by linkage 370a, 370b, 370c, FIG. 25, from the lever 351b which operates the bobbin-end carrier.

Figure 24:
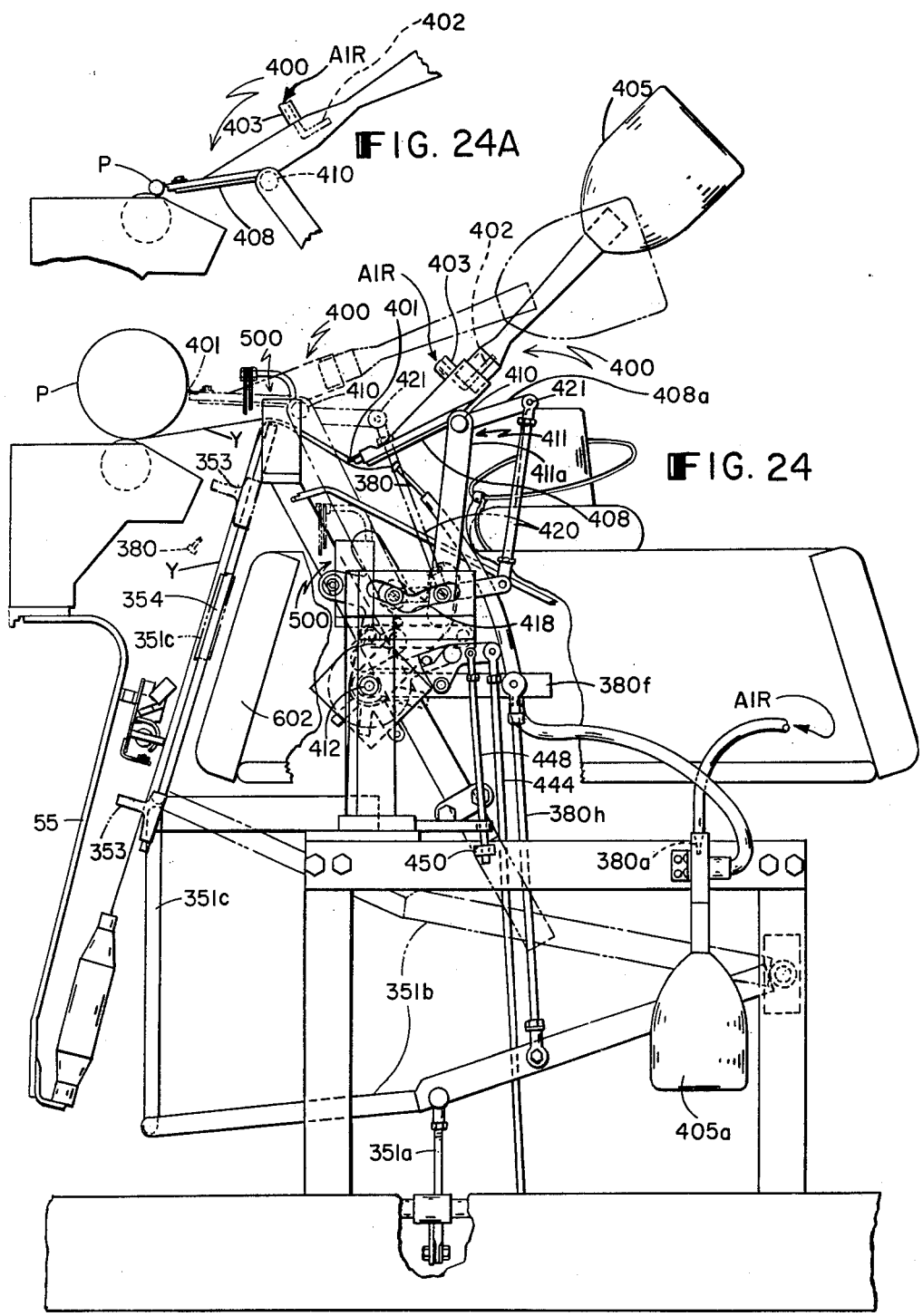
FIG. 24 is a diagrammatic view in the nature of an elevation showing tending mechanism.

A bobbin-end suction tube 380, FIG. 24, swings to meet the slider 353 at the top of the path of the slider and the suction is applied to the tube 380. Suction is created in nozzle 380 by a jet 380a which is supplied with compressed air through a valve controlled by a cam on the horizontal cam shaft. A pervious bag 405a collects the yarn ends. As the tube 380 draws in yarn held by the slider 353 the pin 360 of the slider is again projected and the yarn end is released to the suction tube. This second projection of pin 360 is caused by the pin striking a cam 365 adjacent to the top of the path of travel of the carrier. Discharge of the yarn from engagement with the pin 360 is insured by a lever 385 which lies in a slot in the body of the slider and also in the head portion of the pin. The lever 385 is normally held retracted by a spring 385a sufficiently so as not to interfere with grasping and holding of the yarn by the pin. At the upper position where the yarn is to be released by the yarn end carrier a cam 366 engages a pin 385b to project the lever 385, as shown in FIG. 26, to push the yarn clear of the pin. The suction tube thereupon swings back to a retracted position in which the yarn end from the bobbin lies in position to be received by the knotter indicated generally by the reference character 500. Suction nozzle 380 is carried by arm 380f, FIG. 34, which is pivoted at 308g and swings in conjunction with the motion of bobbin-end carrier 353 by a connecting link 380h which connects arm 380f with lever 351b, FIG. 24.

The bobbin-end carrier is allowed to operate with respect to any winding unit as to which non-winding is detected, even though no yarn is detected by the feeler mechanism. In this latter case, however, bobbin changing mechanism to be described will supply a new bobbin and present its end to the knotter.

The guide track 354, of which a fragment is shown in FIG. 30, forms a convenient place for support of the wire 239 positioned to engage the yarn detector mechanism of any winding unit at the twelve o'clock position to hold the yarn detector mechanism in running position, so that a tended winding unit leaves this twelve o'clock position in operating condition.

*Package end-finding mechanism*

The package end-finding nozzle indicated generally at 400, FIGS. 24, 24A and 27, tapers to a narrow entrance slot at its end which faces the winding package. Either edge of this slot is provided with a flexible sheet rubber lip 401, adapted by light engagement with the surface of the reversely rotating package to loosen the outer end of yarn. The lip may be serrated at its edge which faces the package to increase this effect. Suction is created within the nozzle by the release of air from a high pressure air jet 402 within the nozzle, jet 402 being supplied with high pressure air through a flexible tube 403 connected to an air valve operated by cam shaft 285. A removable pervious bag 405 is adapted to collect yarn ends from the nozzle. The nozzle is pivoted at 407, FIG. 27, to an underlying mounting plate 408 to permit the nozzle to adjust itself to conform to the various tapers of packages of various degrees of completion.

The nozzle is caused to approach the package through a path the last part of which involves the nozzle bearing a substantially constant directional relation to any package encountered in such last part of the path, irrespective of the attained size of the package. To illustrate, the nozzle is kept aimed so that regardless of whether it travels a certain distance and there encounters a large package or travels a greater distance and there encounters a small package the nozzle will in either case point to the axis of the particular package, and be normal to the surface of that particular package. Since the package axis differs considerably in position due to the support of the package on its drive roll, there is provision for a complex motion of the nozzle.

The nozzle mounting plate 408 is pivoted at 410, FIG. 24, to a lever 411 having arm portions 411a, 411b and 411c, FIG. 28A. Lever 411 is pivoted at 412 so that pivot point 410 receives an arcuate motion around 412. The portion 411b of lever 411 has pivoted thereto at 415 the left end of a lever 416 carrying near its middle a cam follower roll 417 running in a cam groove 418 of rounded generally flattened V-configuration. The right end of lever 416 is connected to a link 420 to pivot point 421 on an extension 408A which is rigid with the mounting plate 408 of the nozzle.

Lever 411 is provided with a hub 411d carrying integral therewith a disc 430 adapted to be driven frictionally by a friction driving disc 432, FIGS. 28A and 28B, having an operating arm 432a, FIGS. 28A and 28C. A lever 435 is pivoted at 436 to the friction disc operating arm 432a. Lever 435 is urged by a spring 438 so that its left end abuts a stop pin 439 on arm 432a. To move the nozzle to end-finding position the right end of lever 435 is raised by a rod 444 which is operated by cam 441 on the horizontal cam shaft. The driving connection to the nozzle can, however, yield when the nozzle meets the package because the friction drive to disc 430 can slip. Thus the nozzle will halt at the package regardless of the size of the package. The stroke of the cam 441 is made sufficient so that even with the longest travel of the nozzle to meet the smallest package there will be some remaining stroke of the cam in the direction to continue raising lifter rod 444.

It is desired that the nozzle shall not press hard against the package during end-finding rotation of the package but on the contrary shall move back a little so that its rubber lip only touches the rotating package lightly. A rod 448 is pivotally attached to lever 435 at 449, FIG. 28A, and carries a collar 450, FIG. 24. Near the end of upward movement of the lifter-rod 444, the collar 450 strikes a fixed part of the frame, causing rod 448 to detain the lever 435 at the point 449. With the lever 435 detained at 449, further rise of the lifter-rod 444 rotates the lever 435 in the counterclockwise direction causing pivot point 436 to be depressed and accordingly rotating the friction disc operating lever arm 432a a little in the clockwise direction, and so retracting the nozzle away from the surface of the package until the package is engaged only lightly by the rubber lip of the nozzle.

A blast of high pressure air is admitted to the jet 402 by a valve operated by a cam on the horizontal cam shaft. The winding package is driven in a reverse or unwinding direction by engagement of the conical wheel 180 with the upper drive disc 135. The end of yarn on the package is drawn into the nozzle. The nozzle is then restored to its rearward position, away from the package, by the rod 444 being lowered by a further cam 441a on the horizontal cam shaft 285. In this restored position of the nozzle, the found yarn end lies in position to be taken by a knotter which is indicated generally at 500, FIG. 24.

The return movement of the nozzle is to a definite point because a shoulder on the disc 432 can engage an abutment 430a on the disc 430 to move the disc 430 positively in this direction.

For simplicity of illustration it has not been attempted to show the nozzle 400 in FIG. 24 as pivoting on its mounting plate 408 to conform to the taper of the package when the package is conical, but this is indicated in broken lines in FIG. 27. Moreover, it will be understood that with conical packages it is within the scope of the invention to mount the nozzle so that its slotted mouth is tilted a little downwardly toward the smaller end of the conical package so that the mouth is in general conformity to the inclination of the axis of the conical package.

In the fragmentary showing in FIG. 24A the nozzle mouth is shown as having moved farther from the retracted position than in FIG. 24 and as engaging a very small diameter circumference which might be that of an almost empty cone at the tip portion thereof, the nozzle being aimed substantially at the center of this circumference. A comparison of FIGS. 24 and 24A shows that the nozzle has met both the large circumference and the small circumference in approximately the same relation.

Looked at in its broken line position of FIG. 24, the nozzle has risen considerably above its full line retracted position. The linkage which includes the pivoting of the nozzle at 410, the lever 416, cam follower roll 417, cam 418 and link 420 has considerably turned the nozzle about the pivot 410 in a direction to raise the nozzle mouth more than is due merely to the pivoting around the point 412. In latter parts of motion toward the position of FIG. 24A, the linkage will be turning the nozzle about the pivot 410 in the opposite direction.

Knotting

The knotter indicated generally at 500 is preferably of the type usually used in the automatic winders of Abbott Machine Co., Inc., employing two coaxially disposed rotating tying and cutting bills or beaks, operating in synchronism. The yarn-manipulating elements within the knotter are also preferably operated relative to the bills so that rotation of the bills ties the knot known as the fisherman's knot. United States Patent No. 2,146,713 and corresponding patents of other countries may be referred to as showing the general scheme of tying this knot.

In the present machine the knotter 500 is itself given a motion such that it is well out of the way of paths through which the yarns are carried for their placement in position to be taken by the knotter, whereupon movement of the knotter itself to the yarns, takes the yarns into the knotter. This does not mean that there cannot be overlapping of times of motion of the yarn and knotter, each toward their final position for tying, but merely that the motion of the knotter itself plays an important part in the knotter's taking the yarn.

Knotter 500 is mounted on a carrier bar 501 (FIG. 29) movable in an inclined path guided by rolls 502. FIG. 24 shows the knotter in two positions, retracted from the tying region, and projected into the tying region where yarns lie in it.

Figure 29:
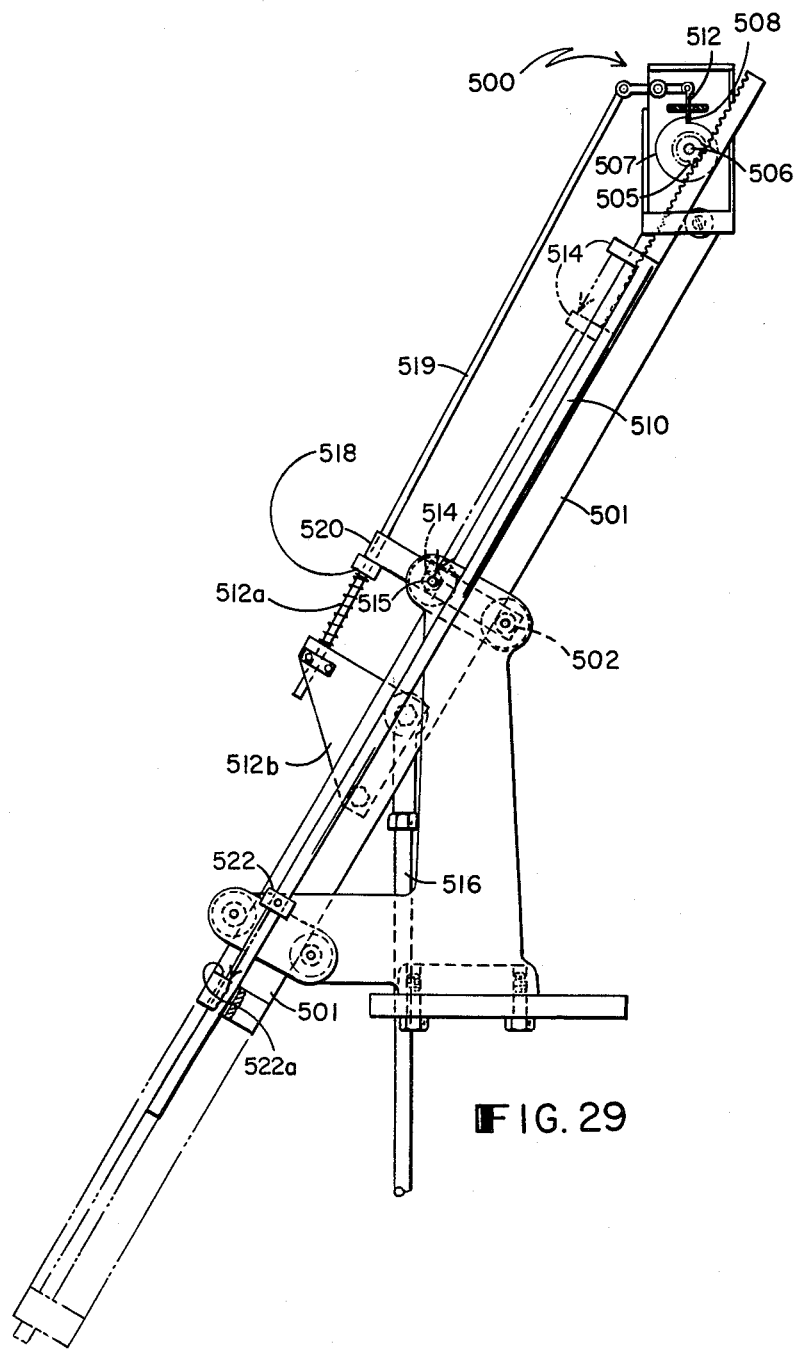
FIG. 29 is an elevation, taken from the point of view opposite to that of FIG. 24, showing the knotter and operating mechanism therefor.

The shaft 505, FIG. 29, which drives the tying bills and yarn manipulating elements of the knotter carries fast thereon a gear 506 and a latch disc 507, the latter having a shoulder 508. A rack bar 510 meshing with the gear 506 can rotate the shaft 505 in both directions. A detent 512, pivoted on the knotter and engageable with shoulder 508, normally prevents clock-wise rotation of the shaft.

The rack bar 510, which need have teeth only at its upper portion, is movable relative to the carrier bar 501, limited in the downward direction by a collar 522 on the rack bar striking a stop element 522a on the carrier bar.

As the carrier bar 501 rises for the knotter to take the yarn, rack bar 510 is held elevated relative to the carrier bar by the action of the detent 512 upon the latch disc 507. The knotter is raised to elevated position by a lifter rod 516 operated by cam 515a on the horizontal cam shaft. As the knotter nears its upper position, a collar 518 on a trip rod 519 which controls the detent 512 strikes a stationary stop 520 as shown in FIG. 29. This releases the latch disc 507, allowing the rack bar, by its weight, to drop and turn the gear 506 to operate the knotter.

After the knot has been tied, the carrier bar 501 is allowed to return to its bottom position. As this occurs, a lug 514 on the rack bar engages and is detained by a stationary stop element 515 on the supporting frame. As the carrier bar 501 continues its downward movement, the rack bar 510 being detained, by stop element 515 the rack rotates the knotter gear 506 in the counter clockwise direction, restoring the mechanism of the knotter and allowing the detent 512 to be moved to detaining position relative to the shoulder 508 by action of a compression spring which acts between the collar 518 and a bracket 512b which moves with the carrier bar 501. Energy, represented by the weight of the rack bar, has thus been stored for the next operation of the knotter. FIG. 29 shows the lug 514 in three positions, an upper full-line position corresponding to the full line position of the rack bar 510, a somewhat lower broken-line position which shows how the rack bar has dropped in operating the knotter, and finally a bottom broken-line position in contact with the stop element 515.

At the conclusion of operation of the knotter the winding operation on the winding unit is restarted automatically by the plate 238 swinging down and allowing the winding unit's pin 227 to lower and its conical roll 180 to engage the drive disc 131.

A pivoted upper pusher wire 580 and a reciprocating lower pusher wire 581 (FIG. 30) force the yarn to assume a path such that it enters the lower yarn guide, the tension device and the slub catcher of the winding unit. The linkages for driving the two pusher wires are operated by two lifter rods 580a, which are operated by the same cam 585 on the horizontal cam shaft. Lifter rod 580a operates a crank arm 580b which in turn swings an arm 580c carrying the upper pusher wire assembly. Lifter rod 581a operates a crank arm 581 which swings an arm 581c connected by link 581d to a reciprocating slide 581c carrying the lower pusher wire assembly.

Bobbin-changing mechanism

As previously indicated, if a winding unit is not running and if the yarn detector fingers do not encounter yarn but move to their intermeshed position, the clutch 242 is allowed to operate to drive the sleeve 287 one revolution. Sleeve 287 carries cams which control the bobbin changing mechanism 600.

Figure 31:
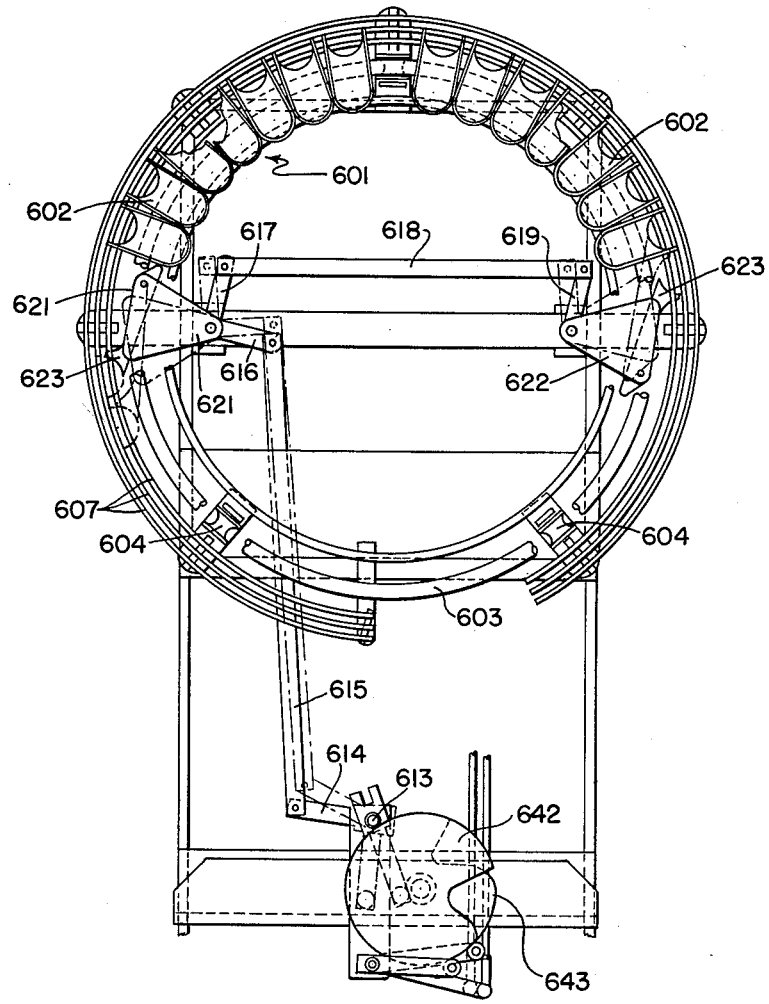
FIG. 31 is a fragmentary plan view showing certain parts of the bobbin magazine and operating connections for certain parts associated therewith.

A bobbin magazine 601, FIG. 31, includes for example thirty-six open-sided bobbin pockets 602. These are attached to a ring 603 which is rotatable in grooved guide rolls on which the ring 603 rests, the ring being broken away in FIG. 31 to show such guide rolls. The bobbin pockets are open at their bottoms and the bobbins therein stand on guide rods 607 which, however, terminate at the position where a winding unit receives a new bobbin.

Figure 34:
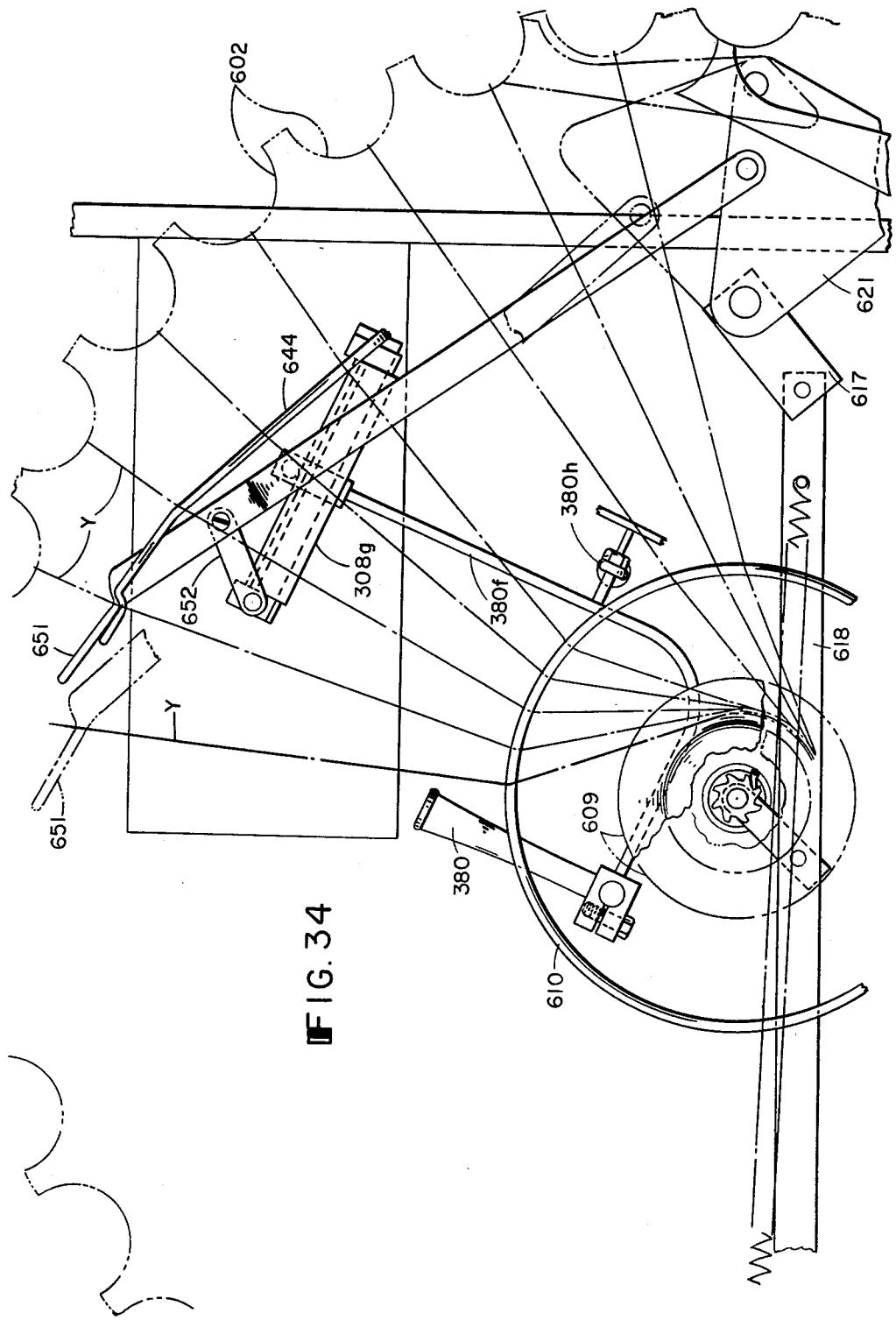
FIG. 34 is a diagram in the nature of a plan showing parts of the bobbin magazine and certain parts associated therewith.

The ends of yarn of the bobbins are placed manually around a central conical end holder 609, FIG. 34, which is given a slow winding motion to keep the ends slightly tensioned and also to wind up the ends of yarn remaining after knot tying.

Figure 32:
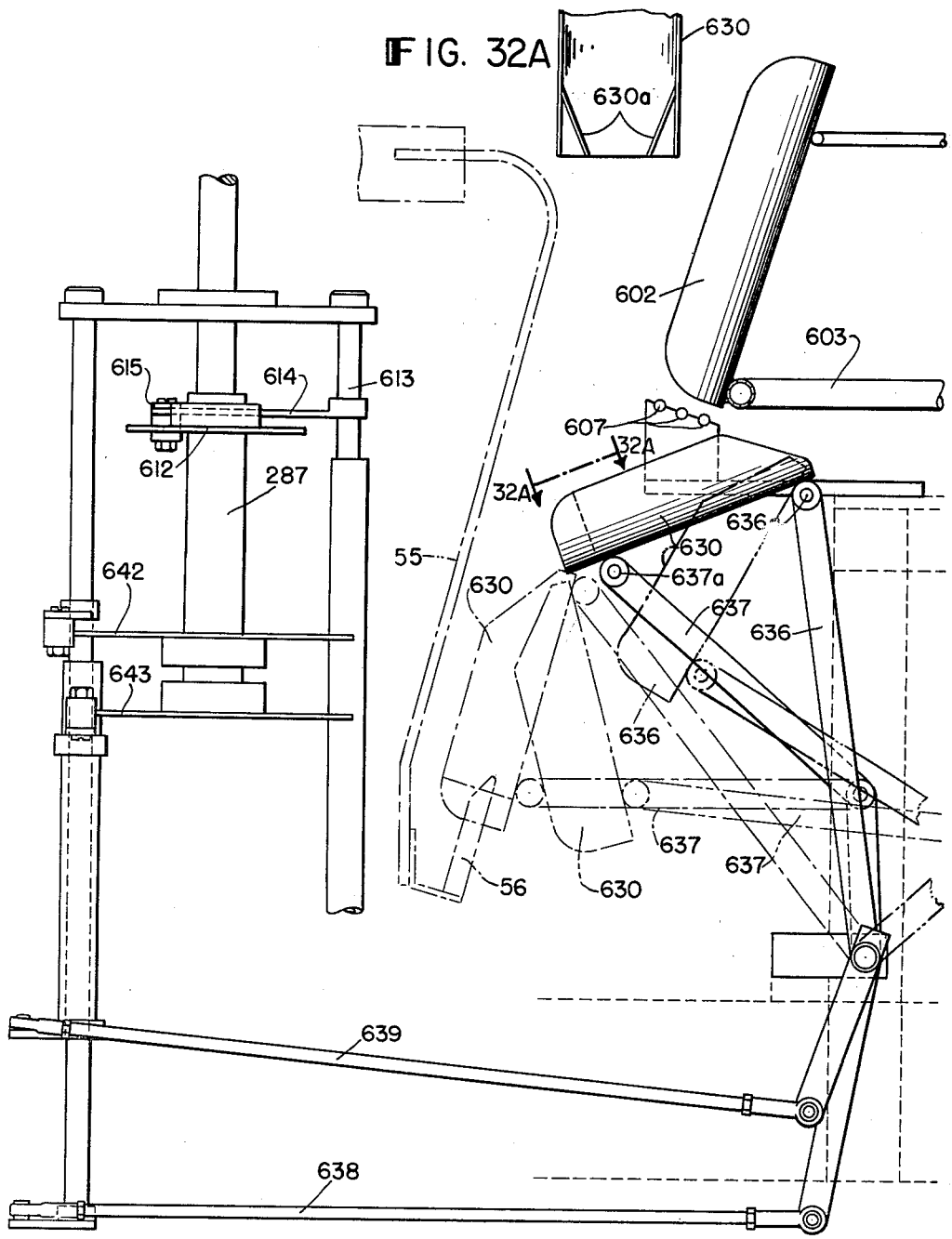
FIG. 32 is a diagram in the nature of an elevation, principally showing bobbin chute mechanism.
Figure 33:
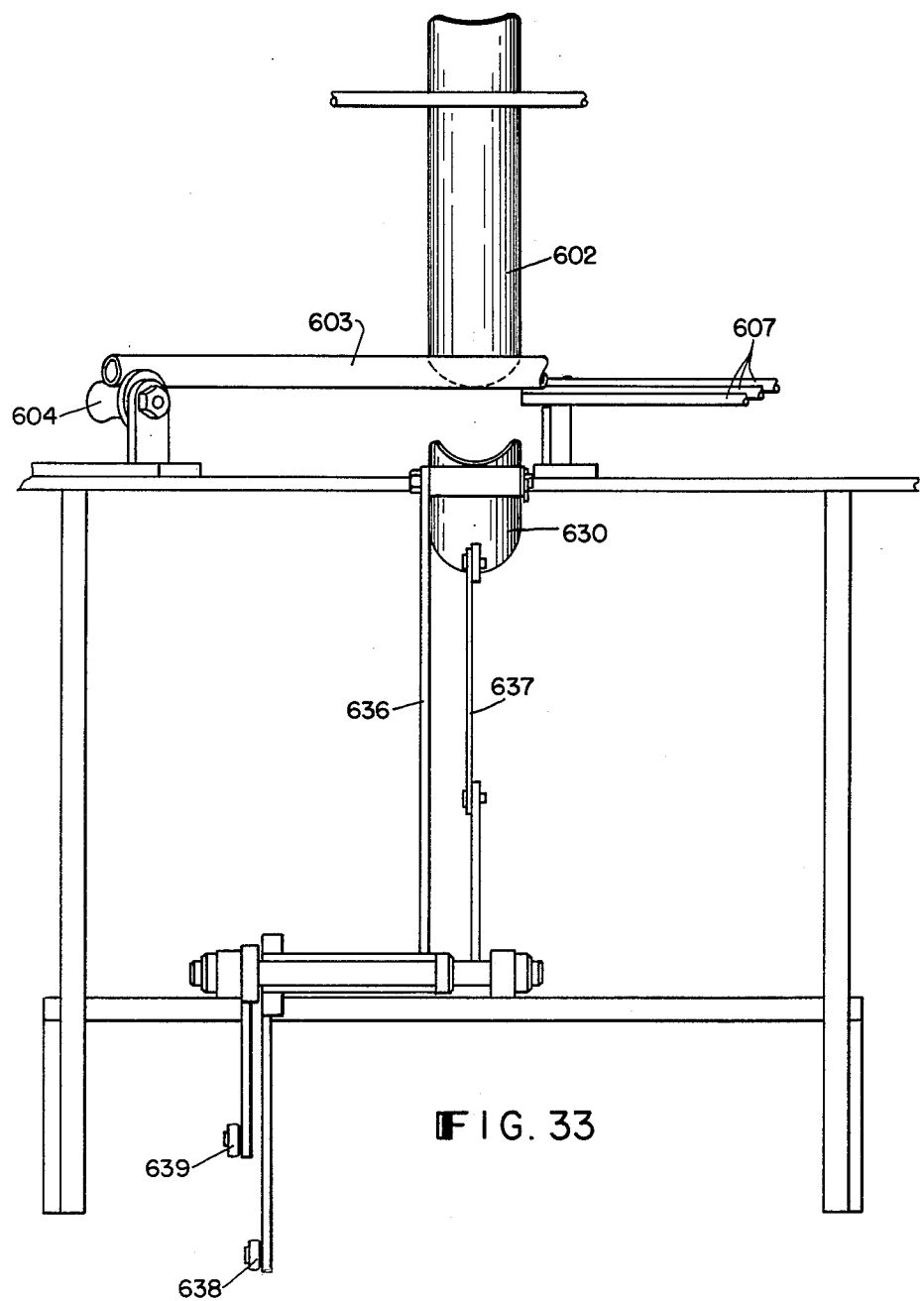
FIG. 33 is a fragmentary view taken from the right of FIG. 32.

Advance of the magazine is by means of a cam 612, FIG. 32, on sleeve 287, the cam follower swinging a post 613 which operates through linkage 614 through 619, FIG. 31, to turn two swinging plates 621 and 622. These plates carry spring pressed pawls 623 shaped to engage with the curved rear faces of bobbin pockets, thus indexing the magazine to the extent of one pocket for each bobbin changing operation.

The cross-link 618 of the aforesaid linkage may also operate a ratchet to rotate the central conical holder.

A bobbin chute 630 is shown in four positions in FIG. 32.

The motion of the chute involves the pivotal attachment of the chute to a crank 636 at 636a and to a link 637 at 637a. These are operated respectively by connecting rods 638 and 639, rod 638 being operated by a rotatable post 640, and rod 639 by a rotatable sleeve 641, which in turn are operated by followers of cams 642 and 643 on sleeve 287. Normally the chute 630 is in its most retracted broken line position of FIG. 32, farthest removed from the course of the bobbins which are carried by the bobbin pegs 56 of the winding units and from the course of the yarns which are unwinding from those units which are actively running. When the chute operates it rises to the full line position of FIG. 32 and receives a bobbin which drops from a bobbin pocket 602 as the latter moves past the ends of wires 607. The chute with the new bobbin in it aligns itself with bobbin peg 56 as shown, the upper part of the peg being received within the chute. Inclined pieces 630a within the chute near its bottom prevent the bobbin from falling out endwise during this movement. The chute then retracts away away from the bobbin pegs leaving the bobbin free to seat on the peg.

As a yarn which extends from a bobbin in a pocket to the central holder approaches the location of the knotter, the yarn is picked up by a stationary guide 644 on which the yarn then rides. When the magazine is indexed and the bobbin is released from its pocket and delivered by the chute, the yarn end of this bobbin is positioned by an oscillating finger 651 which is connected to link 652 and operated by the swinging plate 621. FIG. 34 shows in broken lines the position assumed by finger 651 when it delivers a yarn for knotting. The knotter rises, takes this new bobbin end and the package yarn end found as previously described by the suction nozzle, and ties them.

As in the case of tying an old bobbin end, the tied yarn is pushed into place and the winding unit restarted.

Figure 35:
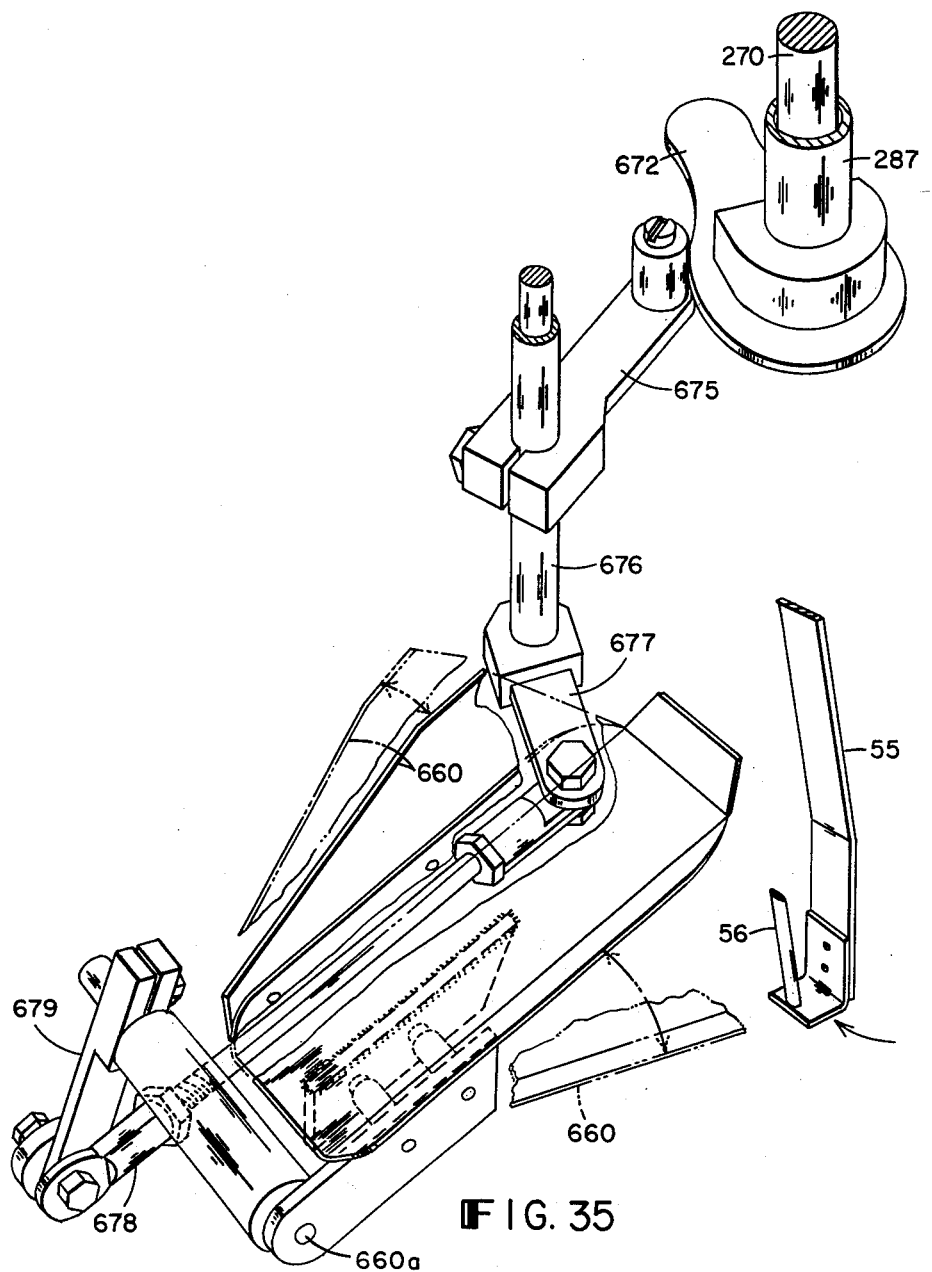
FIG. 35 is a perspective showing bobbin doffing mechanism.

It should be mentioned that when a winding unit is to receive a new bobbin the old bobbin is first removed by a pivoted doffer tray 660, FIG. 35, whose outermost edge rises under the base of a bobbin on the bobbin peg, alloping the bobbin to topple away from the winding unit into the tray as the tray pivots around axis 660a. Further rise of the tray inclines the tray so that the bobbin slides endwise off the tray into a suitable receptacle, not shown. The doffer tray is operated from the follower of a cam 672 on the sleeve 287, through crank 675, sleeve 676, crank 677, link 678 and crank 679. The doffing operation is early in the cycle in order that the bobbin may be doffed without being moved along to the twelve o'clock position. It will be understood that no bobbin is doffed unless the cam-carrying sleeve 287 is operated through its clutch 242.

*Speed control*

A desirable optional feature is that of operating the Geneva drive and associated mechanisms at half speed during automatic tending operations, and also, when desired, operating the Genera drive of the table at half speed during manual removal of the fully wound packages and replacement by new empty cones. Such half-speed operation is in addition to the half revolution-skipping feature of the Geneva drive.

Figure 15:
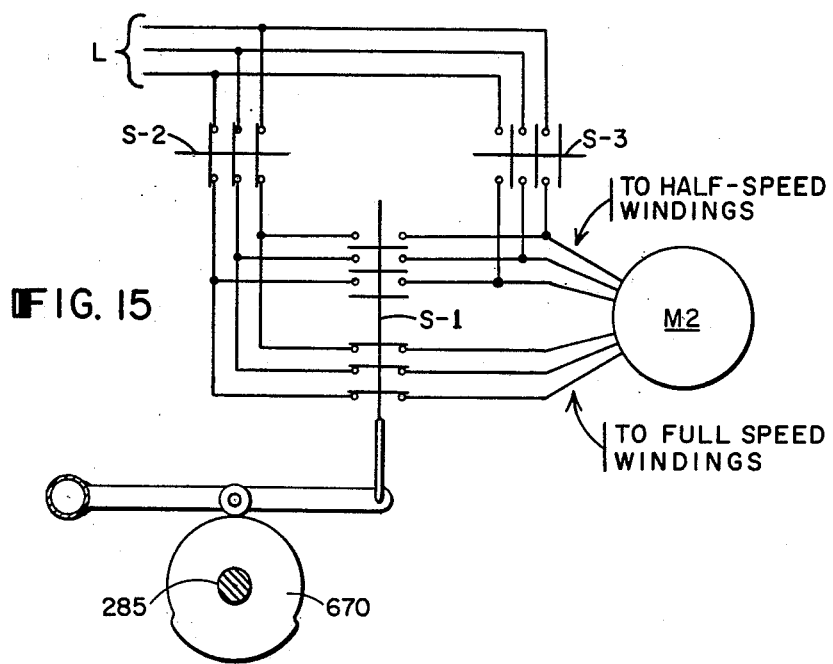
FIG. 15 is a diagram showing means for controlling the speed of drive of the rotating table and of other elements associated with the drive of the rotating table.

The motor M-2 may therefore have windings which will operate it at either full or half speed, and for simplicity of illustration, windings are thus designated separately in the schematic wiring diagram of FIG. 15. A switch S-1 under the control of a cam 670 on cam shaft 285 may then transfer the power supply from the full speed windings to the half speed windings for most of a revolution of the cam shaft 285 during a cycle of tending. A manual switch S-2 can establish the circuits from the line L which are controlled by switch S-1. Further manual switching means diagrammatically indicated at S-3 can permit half speed operation when switch S-2 is open, so that even though the cam shaft 285 remains at rest the winder table 52 can be circulated at slow speed when desired.

*Horizontal cam shaft*

The horizontal cam shaft 285, of which the major portion is shown in FIG. 36, in addition to rotating the eccentric 330, the cam 238b for controlling the reverse driving of the package and restarting of the package, the cam 351 for operating the yarn end carrier mechanism, the cam 585 for operating the upper and lower yarn pusher linkages, the cam 515a for operating the lifter rod 516 for the knotter, the cams 441 and 441a for raising and lowering the rod 444 which operates the package yarn end finding nozzle, and the cam 670 which operates switching means to cause the motor to run at slow speed, may also carry an index cam 680. The horizontal cam shaft also operates air valves 690 and 691 for admitting air blasts to jet tubes connected respectively to the bobbin yarn suction nozzle and to the package yarn end-finding nozzle, and an air valve 692 for admitting compressed air to a nozzle directed at the tension device and slub catcher of a winding unit. Cams 690a, 691a and 692a on shaft 285 operate these valves.

All of these air valves are normally closed, and only opened in those cycles in which the horizontal cam shaft operates in tending a winding unit.

I claim:

1. An automatic winding machine including a plurality of winding units, means for conveying the units in a procession, winding-unit tending mechanism disposed at a place past which the units travel, detecting means for determining whether a winding unit requires tending, said detecting means controlling the operation of the tending means, the machine including a motor adapted to operate at two speeds, one lower than the other, for driving the tending means and also the conveying means, an intermittent motion driving connection between the motor and the conveying means, and means under control of the detecting means operating when the tending means operates for switching the motor to its lower speed and for disconnecting the conveying means from the motor.

2. An automatic winding machine including a rotatable table, a plurality of winding units carried by the table, a Geneva drive mechanism for imparting an intermittent motion to the table, the Geneva drive mechanism having two drive rollers which alternately engage the table to advance the table one step each so that, in normal driving, the table dwells only a small fraction of the time, tending mechanism operative at one of the places of dwell of winding units, means for detecting whether a winding unit requires tending, a clutch normally driving the Geneva drive mechanism, the clutch including a constantly rotating driving element and a driven element disconnectible from the constantly rotating driving element, and clutch-operating mechanism under control of the detecting means for causing the clutch to disconnect after a step of intermittent motion of the table has followed detection that a winding unit requires tending.

3. An automatic winding machine including a plurality of winding units, means for conveying the units in a procession, winding unit tending mechanism disposed at a place past which the units travel, detecting means for determining whether a winding unit requires tending, means whereby the detecting means institutes a cycle of operation of the tending means, the machine including a motor adapted to operate at two speeds, one lower than the other, for driving the tending means and also the conveying means, and means responsive to the institution of a cycle of operation of the tending means for switching the motor to its lower speed and for disconnecting the conveying means from the motor.

4. An automatic winding machine including a rotatable table, a plurality of winding units carried by the table, a Geneva drive mechanism for imparting an intermittent motion to the table, the Geneva drive mechanism having a plurality of drive rollers which successively engage the table to advance the table one step each, so that, in normal driving, the steps of advance are longer in time than the intervening periods of dwell, tending mechanism operative at one of the places of dwell of winding units, means for detecting whether a winding unit requires tending, a clutch normally driving the Geneva drive mechanism, the clutch including a constantly rotating driving element and a driven element, and clutch-operating mechanism under control of the detecting means for causing the clutch to disconnect after one roller of the Geneva drive mechanism effects one step of advance of the table subsequent to the detection of a winding unit requiring tending.

5. An automatic winding machine including a plurality of winding units, winding unit tending mechanism, means for conveying the units past the tending mechanism, and means for detecting whether a winding unit requires tending, a first clutch controlling the tending mechanism, a second clutch for driving the conveying means, each clutch including a continually rotating driving element, the driving elements of the two clutches being connected in fixed relation, the first clutch being normally disconnected and being disconnectable at a predetermined position of its driving member, means whereby the detecting means causes connection of the first clutch upon detection of need for tending, the second clutch being normally connected and being disconnectable at two predetermined 180° opposed positions of its driving member, a Geneva drive mechanism connecting the driven member of the second clutch and the conveying means, the Geneva mechanism including two driving rollers engaging the conveying means successively so that one revolution of the Geneva drive mechanism intermittently advances the conveying means two steps, and means whereby operation of the driven member of the first clutch causes disconnection of the second clutch for a half revolution of the driving member of the second clutch.

6. An automatic winding machine including a plurality of winding units, means for conveying the units in a procession in a step by step movement, tending mechanism adapted to tend the units at a tending position to which they are brought by such step by step movement, detecting mechanism acting on the winding units at one step in advance of said tending position for determining whether the units need tending, said detecting mechanism controlling the tending mechanism, means for skipping a step of movement of the units when a unit requiring tending arrives at the tending station, the detecting mechanism including movable members adapted to be blocked by the presence of yarn at a predetermined region, the tending mechanism including means for supplying a bobbin to a winding unit being tended, said movable members when moved through said predetermined region and not there being blocked by yarn then instituting operation of the bobbin supplying means of the tending mechanism, and means for operating said movable members in dependence upon the step by step movement of the winding units so that in case of skipping a step of such movement operation of said movable members is avoided.

References Cited in the file of this patent

UNITED STATES PATENTS

| 1,324,889 | Foster | Dec. 16, 1919 |
| 1,347,626 | Foster | July 27, 1920 |
| 1,801,378 | Swanson | Apr. 21, 1931 |
| 1,816,352 | Anderson | July 28, 1931 |
| 1,964,714 | Abbott | July 3, 1934 |
| 2,160,810 | Abbott | June 6, 1939 |
| 2,264,784 | Abbott | Dec. 2, 1941 |
| 2,432,722 | Campbell | Dec. 16, 1947 |
| 2,733,870 | Furst | Feb. 7, 1956 |
| 2,758,799 | Furst | Aug. 14, 1956 |
| 2,769,599 | Furst | Nov. 6, 1956 |
| 2,987,335 | Tarbox | June 6, 1961 |
| 3,030,040 | Reiners | Apr. 17, 1962 |

FOREIGN PATENTS

| 1,180,505 | France | Dec. 29, 1958 |